United States Patent
Annappindi

(10) Patent No.: US 8,799,150 B2
(45) Date of Patent: Aug. 5, 2014

(54) SYSTEM AND METHOD FOR PREDICTING CONSUMER CREDIT RISK USING INCOME RISK BASED CREDIT SCORE

(75) Inventor: Suresh Kumar Annappindi, Bear, DE (US)

(73) Assignee: Scorelogix LLC, New Castle, DE (US)

( * ) Notice: Subject to any disclaimer, the term of this patent is extended or adjusted under 35 U.S.C. 154(b) by 607 days.

(21) Appl. No.: 12/582,507

(22) Filed: Oct. 20, 2009

(65) Prior Publication Data

US 2011/0078073 A1 Mar. 31, 2011

Related U.S. Application Data

(60) Provisional application No. 61/247,421, filed on Sep. 30, 2009.

(51) Int. Cl.
| | |
|---|---|
| *G06Q 40/00* | (2012.01) |
| *G06Q 40/04* | (2012.01) |
| *G06Q 40/02* | (2012.01) |
| *G06Q 40/08* | (2012.01) |

(52) U.S. Cl.
CPC ............... *G06Q 40/00* (2013.01); *G06Q 40/04* (2013.01); *G06Q 40/025* (2013.01); *G06Q 40/08* (2013.01)
USPC ............... 705/38; 705/322; 705/7.28; 705/35

(58) Field of Classification Search
CPC ....... G06Q 40/00; G06Q 40/04; G06Q 40/08; G06Q 40/02
USPC ..................... 705/7.28, 35, 38, 322
See application file for complete search history.

(56) References Cited

U.S. PATENT DOCUMENTS

| | | | | |
|---|---|---|---|---|
| 6,658,393 | B1 * | 12/2003 | Basch et al. | 705/38 |
| 7,421,406 | B2 * | 9/2008 | Dixon et al. | 705/36 R |
| 7,451,095 | B1 | 11/2008 | Bradley et al. | |
| 7,970,676 | B2 * | 6/2011 | Feinstein | 705/35 |
| 8,090,600 | B2 * | 1/2012 | Ziade et al. | 705/4 |
| 2002/0198819 | A1 | 12/2002 | Munoz et al. | |
| 2003/0101080 | A1 | 5/2003 | Zizzamia et al. | |
| 2004/0186807 | A1 * | 9/2004 | Nathans et al. | 705/38 |

(Continued)

OTHER PUBLICATIONS

"Scorelogix Job Security Score" website, Jun. 24, 2008 version, www.jobsecurityscore.com, (downloaded Jan. 4, 2012 from Web. archive.org).*

(Continued)

*Primary Examiner* — Kirsten Apple
*Assistant Examiner* — Joan Goodbody
(74) *Attorney, Agent, or Firm* — Blank Rome LLP

(57) ABSTRACT

Systems and methods are described for scoring consumers' credit risk by determining consumers' income risk and future ability to pay. Methods are provided for measuring consumers' income risk by analyzing consumers' income loss risk, income reduction risk, probability of continuance of income, and economy's impact on consumers' income. In one embodiment, a method is provided to evaluate an individual's creditworthiness using income risk based credit score thereby providing creditors, lenders, marketers, and companies with deeper, new insights into consumer's credit risk and repayment potential. By predicting consumers' income risk and the associated creditworthiness the present invention increases the accuracy and reliability of consumers' credit risk assessments, results in more predictive and precise consumer credit scoring, and offers a new method of rendering a forward-looking appraisal of an individual's ability to repay a debt or the ability to pay for products and services.

10 Claims, 45 Drawing Sheets

(56) References Cited

U.S. PATENT DOCUMENTS

| | | | |
|---|---|---|---|
| 2005/0125259 A1* | 6/2005 | Annappindi | 705/4 |
| 2006/0059073 A1 | 3/2006 | Walzak | |
| 2006/0212386 A1 | 9/2006 | Willey et al. | |
| 2007/0124236 A1 | 5/2007 | Grichnik et al. | |
| 2007/0262140 A1* | 11/2007 | Long | 235/380 |
| 2008/0010154 A1 | 1/2008 | Tietzen et al. | |
| 2008/0091592 A1 | 4/2008 | Blackburn et al. | |
| 2008/0110973 A1* | 5/2008 | Nathans et al. | 235/379 |
| 2008/0255975 A1 | 10/2008 | Chaudhuri et al. | |
| 2009/0024478 A1* | 1/2009 | Dixon et al. | 705/14 |
| 2009/0037308 A1 | 2/2009 | Feinstein | |
| 2009/0037323 A1 | 2/2009 | Feinstein et al. | |
| 2009/0125439 A1 | 5/2009 | Zarikian et al. | |
| 2009/0150190 A1* | 6/2009 | Solomon et al. | 705/4 |
| 2009/0198629 A1* | 8/2009 | De Prisco et al. | 705/36 R |
| 2009/0222380 A1 | 9/2009 | Choudhuri et al. | |
| 2010/0023434 A1* | 1/2010 | Bond | 705/35 |

OTHER PUBLICATIONS

Larry Rosenberger, Fair Isaac Corporation Presentation, Research Fellow: Views of Mortgage Lending: Past, Present, Future, Oct. 19-22, 2008, pp. 1-14.

Dean Foust and Aaron Pressman, Credit Scores: Not-So-Magic Numbers, BusinessWeek, Feb. 7, 2008, 2 pgs.

The People's Credit Bureau, A Chronological History of the Credit Industry in America, 5 pgs, peoplescreditbureau.com.

Alexis Leondis, FICO Scores Show Flaws as U.S. Banks Cut Credit Lines (Update 1), Bloomberg.com, Jun. 30, 2009, 3 pgs.

Alex Baker and Jennifer Tescher, Highlights from the 2nd Annual Underbanked Financial Services Forum Emerging Markets, Emerging Opportunities, Center for Financial Services Innovation, An Affiliate of ShoreBank Corporation, cfsinnovation.com, pp. 1-17, 2007.

Tingting Ji, Consumer Credit Delinquency and Bankruptcy Forecasting Using Advanced Econometrc Modeling, Munich Personal RePEc Archive, Paper No. 3187, posted Nov. 7, 2007, Oct. 30, 2004, pp. 1-33.

Jane J. Kim, Credit Scorers Find New Ways to Judge You, The Wall Street Journal, WSJ.com, Mar. 11, 2008, 3 pgs.

Jennifer Wheary and Tamara Draut, Who Pays? The Winners and Losers of Credit Card Deregulation, Demos A Network for Ideas & Action, www.demos.org, 20 pgs., Aug. 1, 2007.

\* cited by examiner

FIGURE 3

Consumer Payment Risk Matrix

| Consumer Willingness? | Consumer Ability? | Consumer Payment? | |
|---|---|---|---|
| Yes | Yes | Yes | — 301 |
| No | Yes | No | — 302 |
| No | No | No | — 303 |
| Yes | No | No | — 304 |

Unsecured Loan Credit Risk = Willingness + Capacity

FIGURE 10

Credit Bureau Scores (e.g. FICO, Beacon, Vantage, etc) Limitations                                             1001

- Based on credit histories
- Cannot score people with limited or no credit histories
- Do not consider income disruption risk
- Do not consider impact of economy on consumers' future income and income continuance

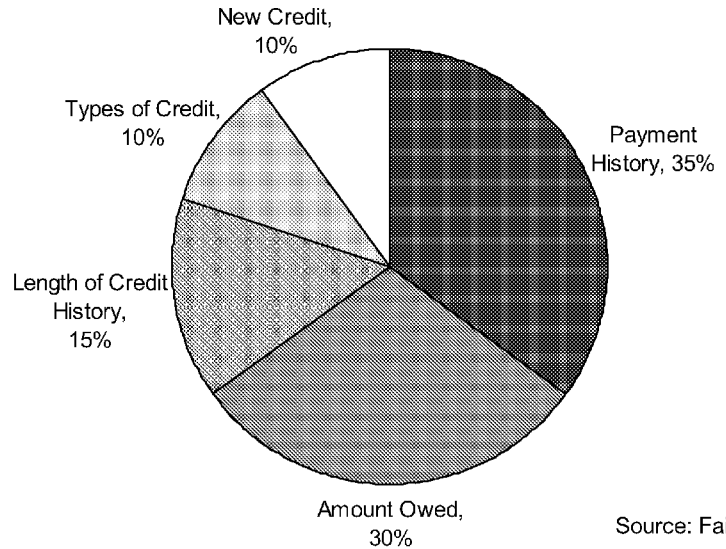

Breakdown of FICO

- New Credit, 10%
- Types of Credit, 10%
- Length of Credit History, 15%
- Amount Owed, 30%
- Payment History, 35%

Source: Fair Isaac

ALTERNATIVE CREDIT SCORES:

- Based on non-credit data such as rent, telephone, insurance and utility payments to predict credit risk
- Do not use income disruption risk

1101

Another Reason to Pay Your Bills on Time

More lenders, wary of taking undue credit risks, are looking at new ways to gauge whether to lend consumers money, such as how they pay their rent and utility bills. Here's how credit bureaus and others are using nontraditional payment data:

| Score | What it does |
|---|---|
| Equifax's MarketMax | In addition to using data from Equifax's own credit files, as well as data it has collected on rent and utility payments, for example, the score pulls information from LexisNexis to verify identities and flag any negative information, such as tax liens, bankruptcies and criminal records. Score range: 501 to 900. |
| Experian's Emerging Credit Score | Relies on payment data, such as telephone and utility records and catalog or Internet purchases, provided by eBureau LLC, in addition to data from its own credit files. Score range: 300 to 999. |
| FICO Expansion Score | Looks at information on how consumers pay their rent, cable and utility bills, among other things, by pulling information from several databases and public records. The score has the same range as the traditional FICO score: 300 to 850. |
| First American CREDCO's Anthem Score | The score, which is used by mortgage lenders, is based on alternative payment sources, such as rental, insurance and utility payments. |
| PRBC's Bill Payment Score | At PRBC, consumers can create their own credit file by reporting monthly payments to the company, which verifies the data for a fee and creates a credit file and score for lenders. Users can also use a bill-payment service to have their bills automatically reported to PRBC for free. |
| TransUnion's Link2Credit | In addition to using data from TransUnion's own credit files, the score relies on data provided by L2C Inc., such as consumers' payment histories on their rent, cable and utility bills. Score range: generally between 300 and 850. |

Source: the companies

1102

Source: The Wall Street Journal
http://online.wsj.com/article/SB120519158709225603.html

FIGURE 12

Existing Credit Scoring Models & Limitations

| Credit Score | Description | Limitations | |
|---|---|---|---|
| Credit Bureau Scores (FICO, Beacon, Vantage, etc) | • Based on consumers' credit bureau histories<br>• No usable score if sufficient credit history is not present<br>• Suggests future payment behavior will mirror past payment record | • Do not consider consumers' income disruption risk | 1201 |
| Lenders' Internal Credit Scores and Custom Credit Scores | • Typically a variation of credit bureau scores<br>• Based on consumers' credit bureau histories<br>• Based on lenders' own portfolio credit performance data<br>• Based on 3rd party portfolio data | • Do not consider consumers' income disruption risk | 1202 |
| Alternative Credit Scores | • Based on consumers' non-credit payment histories including rent, phone bills, and utility payments<br>• Not based on consumers' credit histories | • Do not consider consumers' income disruption risk | 1203 |

Income Risk Based Credit Score (its embodiment as JSS) versus traditional credit score (its embodiment as FICO) for payment default risk Income Risk Based Credit Score (its embodiment as JSS) versus traditional credit score (its embodiment as FICO) for payment default risk Income Risk Based Credit Score (its embodiment as JSS) and its odds ratio for payment default risk

FIGURE 15

Income Risk Based Credit Score (its embodiment as JSS) versus traditional credit score (its embodiment as Custom Score) for payment default risk

| Custom Score | JSS | | | | | | | | |
|---|---|---|---|---|---|---|---|---|---|
| | <= 399.96 | 399.97 - 496.62 | 496.63 - 565.38 | 565.39 - 618.13 | 618.14 - 662.46 | 662.47 - 701.25 | 701.26 - 736.64 | 736.65 - 772.16 | 772.17 - 816.45 | 816.46+ |
| <= 431.00 | 1564 | 1035 | 771 | 651 | 530 | 408 | 318 | 272 | 192 | 147 |
| 432.00 - 441.00 | 1004 | 818 | 685 | 618 | 532 | 409 | 336 | 289 | 217 | 163 |
| 442.00 - 449.00 | 953 | 849 | 739 | 615 | 568 | 492 | 401 | 341 | 266 | 213 |
| 450.00 - 456.00 | 814 | 767 | 712 | 634 | 543 | 499 | 414 | 378 | 295 | 229 |
| 457.00 - 462.00 | 740 | 718 | 713 | 676 | 553 | 520 | 465 | 365 | 343 | 286 |
| 463.00 - 468.00 | 633 | 826 | 643 | 577 | 580 | 475 | 459 | 418 | 363 | 318 |
| 469.00 - 474.00 | 526 | 566 | 632 | 576 | 511 | 484 | 445 | 397 | 371 | 333 |
| 475.00 - 482.00 | 509 | 567 | 602 | 571 | 588 | 577 | 551 | 548 | 374 | 415 |
| 483.00 - 490.00 | 375 | 495 | 512 | 529 | 543 | 556 | 507 | 489 | 518 | 459 |
| 491.00 - 500.00 | 391 | 464 | 524 | 533 | 576 | 604 | 624 | 671 | 563 | 582 |
| 501.00 - 510.00 | 293 | 325 | 396 | 477 | 498 | 567 | 628 | 668 | 703 | 680 |
| 511.00 - 522.00 | 161 | 314 | 438 | 451 | 491 | 601 | 640 | 657 | 805 | 716 |
| 523.00 - 534.00 | 71 | 211 | 322 | 357 | 517 | 574 | 692 | 719 | 817 | 871 |
| 535.00 - 546.00 | 17 | 64 | 262 | 361 | 478 | 613 | 636 | 827 | 942 | 1149 |
| 547.00+ | 5 | 29 | 106 | 253 | 366 | 591 | 593 | 826 | 1020 | 1191 |

■ Bads (payment defaults)

▨ Goods (no payment defaults)

▨ Goods gained using JSS (defaults reduced)

Income Risk Based Credit Score (its embodiment as JSS) and its ability to predict mortgage insurance claims (Payment defaults)

Tracking GDP: LEHI economic indicator – Usable in computing Income Risk Based Credit Score
(Lower LEHI indicates higher payment default risk)

Tracking GDP: JSI economic indicator – Usable in computing Income Risk Based Credit Score (Lower JSI indicates higher payment default risk)

Total Credit Risk = Future Willingness + Future Ability

Predicting local economic health: LEHI economic indicator used in computing Income Risk Based Credit Score
(Lower LEHI indicates higher payment default risk)

Income Risk Based Credit Score (its embodiment as JSS) and payment default risk (delinquency rate)

FIGURE 23

Income Risk Based Credit Score (its embodiment as JSS) and its effectiveness as a credit score and its statistical analysis (KS stats)

| Test Statistics: Approved File: Active accounts - Stroll rates | | JSS | VAN | JSS+VAN SCR |
|---|---|---|---|---|
| Most Extreme Differences | Absolute | 12% | 10% | 15% |
| | Positive | 0.00132% | 0.03515% | 0.01637% |
| | Negative | -12.01720% | -10.30866% | -14.78582% |
| Kolmogorov-Smirnov Z | | 18.4949387 | 15.9114063 | 22.7559577 |
| Asymp. Sig. (2-tailed) | | 0.00000000 | 0.00000000 | 0.00000000 |

*Grouping Variable: perf:NP=1;GD=0*

Income Risk Based Credit Score (its embodiment as ISS) versus traditional response score (its embodiment as RESP SCR) for prospect scoring Income Risk Based Credit Score (its embodiment as ISS) versus traditional response score (its embodiment as RESP SCR) for prospect scoring
Prescreen File: Cumulative Response Rates - RESP SCR vs. ISS+RESP SCR

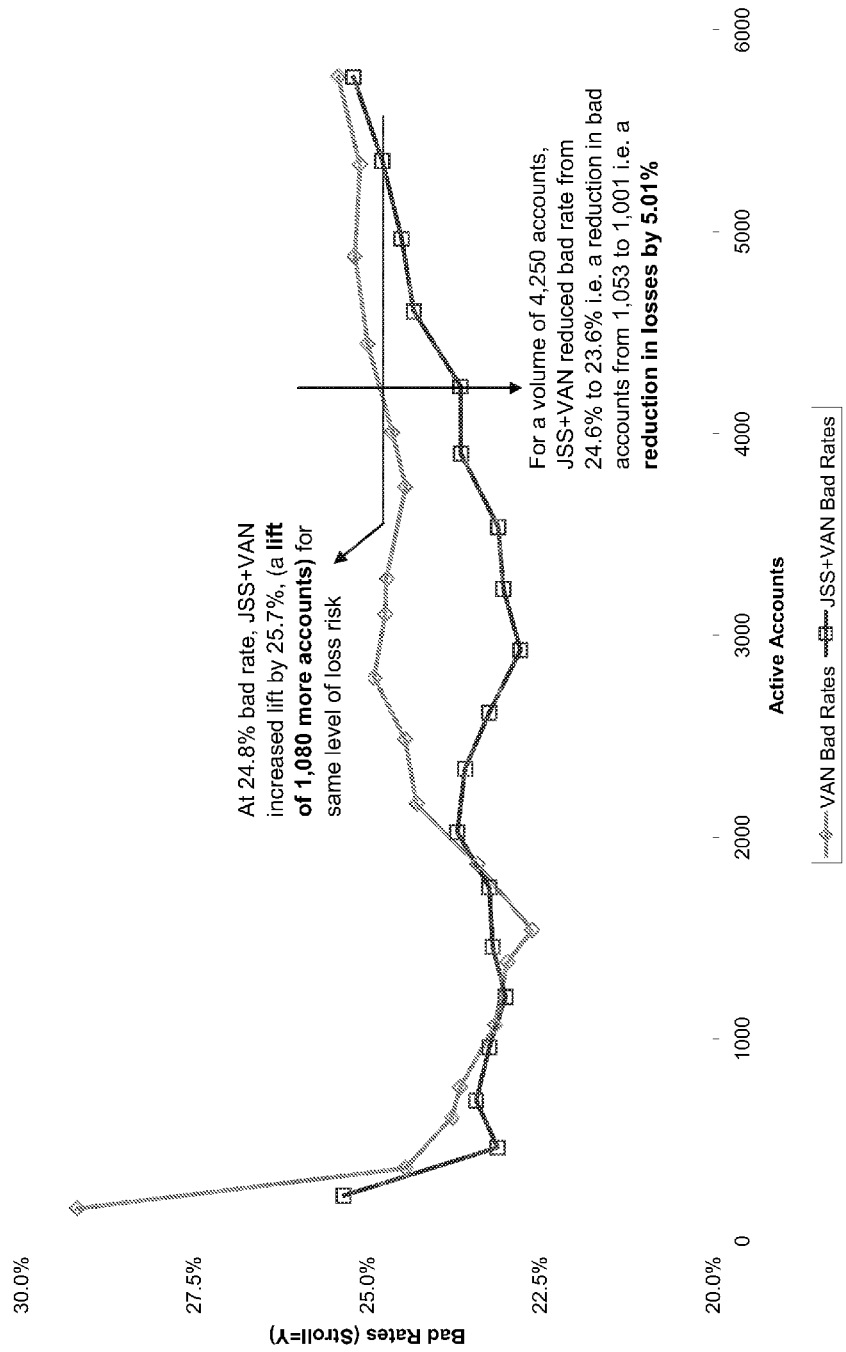

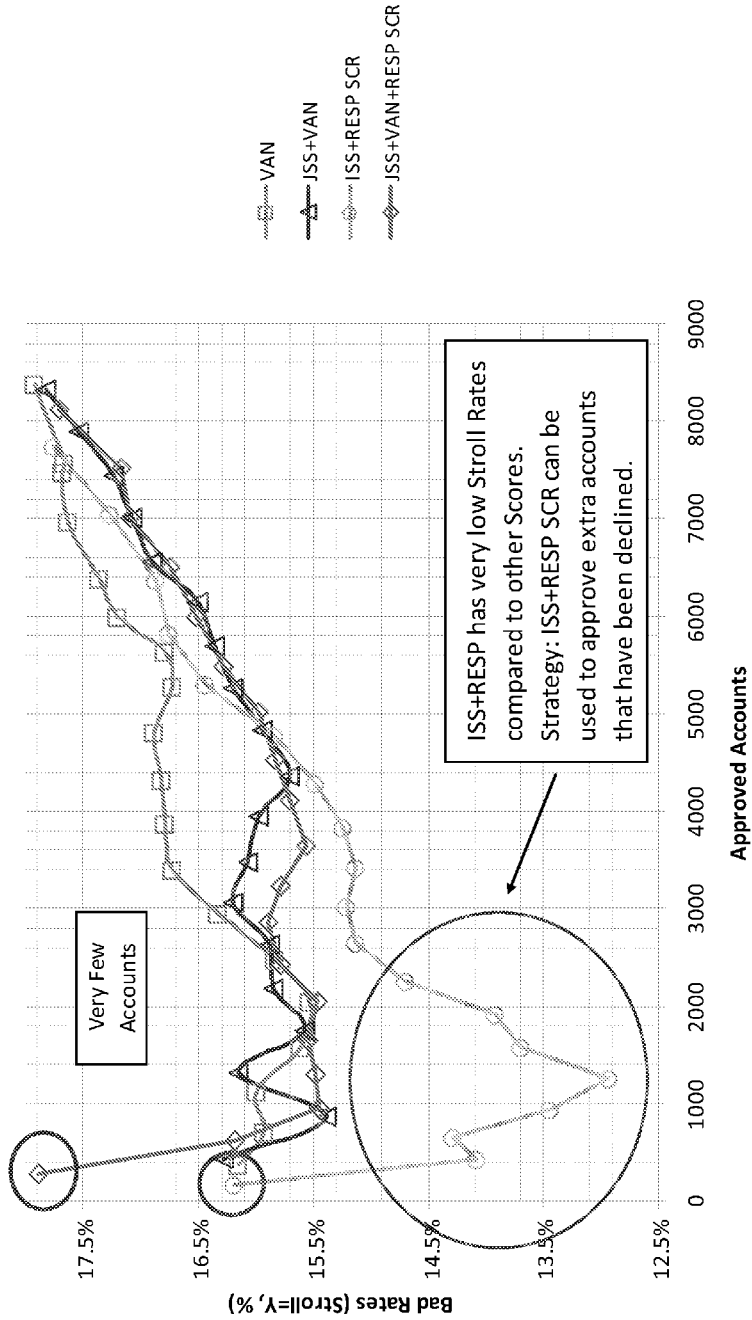

FIGURE 28

Income Risk Based Credit Score (its embodiment as JSS and ISS) versus traditional response score (its embodiment as RESP and VAN SCR) for prospect scoring

Test Statistics: Prescreen File: Approved accounts - Stroll rates

|  |  | ISS+RESP SCR | JSS+VAN | VAN | RESP SCR | JSS+VAN+RESP SCR |
|---|---|---|---|---|---|---|
| Most Extreme Differences | Absolute | 9.1% | 8.6% | 5.8% | 6.1% | 8.4% |
|  | Positive | 9.0968% | 0.6036% | 0.2935% | 6.1128% | 0.4927% |
|  | Negative | -0.2479% | -8.6091% | -5.7532% | -0.4328% | -8.3901% |
| Kolmogorov-Smirnov Z |  | 3.265630 | 3.105376 | 2.082913 | 2.213112 | 3.026357 |
| Asymp. Sig. (2-tailed) |  | 0.000000 | 0.000000 | 0.000341 | 0.000111 | 0.000000 |

Test Statistics: Prescreen File: Prospects - Response rates

|  |  | RESP SCR | ISS+RESP SCR | ISS |
|---|---|---|---|---|
| Most Extreme Differences | Absolute | 18% | 20% | 7% |
|  | Positive | 18.46644% | 19.67500% | 7.30117% |
|  | Negative | 0.00000% | -0.00053% | -0.00265% |
| Kolmogorov-Smirnov Z |  | 24.2952644 | 25.8853007 | 9.6057491 |
| Asymp. Sig. (2-tailed) |  | 0.00000000 | 0.00000000 | 0.00000000 |

*Grouping Variable: respY*

Income Risk Based Credit Score (its embodiment as JSS_IN) and consumer delinquencies Income Risk Based Credit Score (its embodiment as ISS) versus traditional credit score (its embodiment as Vantage) predicting response rates Income Risk Based Credit Score (its embodiment as ISS) versus traditional credit score (its embodiment as Vantage) predicting payment default risk (bad rates)

FIGURE 33
Income Risk Based Credit Score (its embodiment as JSS) versus traditional credit score (its embodiment as CBS score) for payment default risk
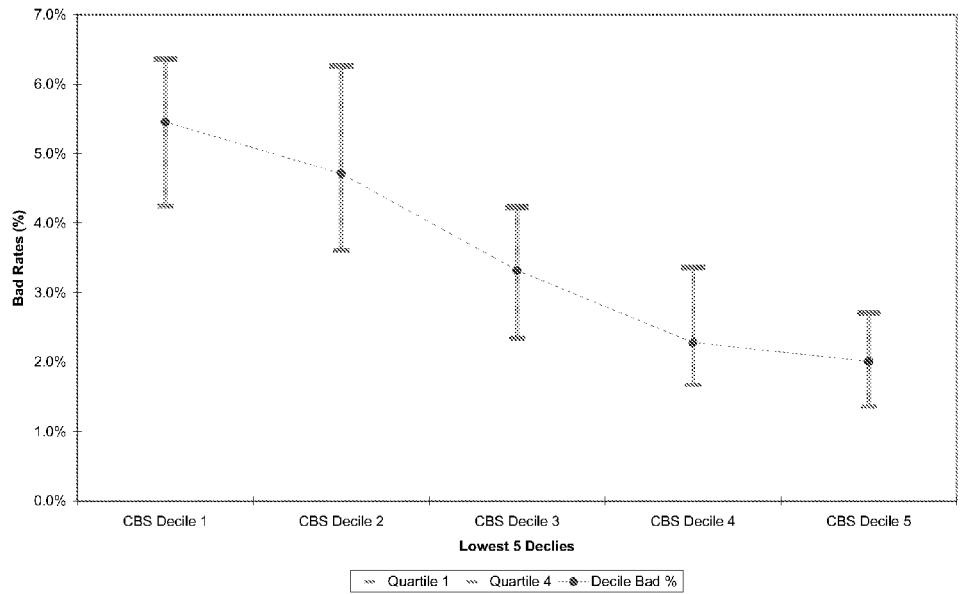
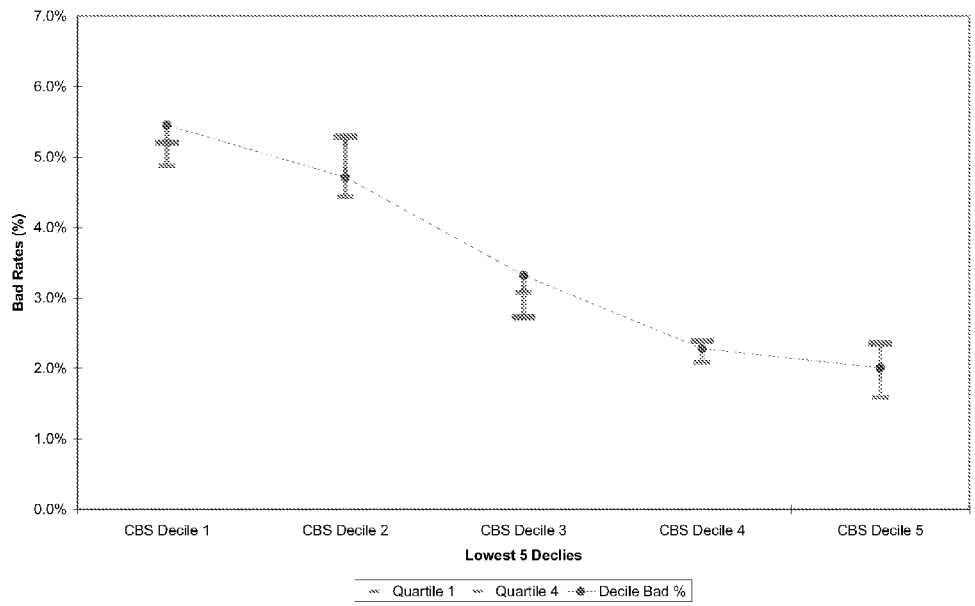

Income Risk Based Credit Score (its embodiment as JSS) versus traditional credit score (its embodiment as CBS score) for payment default risk

FIGURE 35

Income Risk Based Credit Score (its embodiment as JSS) versus traditional credit score (its embodiment as CBS score) for payment default risk Each cell = Quarter-decile. Arrows and numbers indicate cell selection sequence.

| Account Segments | JSS Quartiles (Cell Selection Strategy: Diagonal) | | | | CBS Quartiles (Cell Selection Strategy: Linear) | | | |
|---|---|---|---|---|---|---|---|---|
| | Quartile 1 | Quartile 2 | Quartile 3 | Quartile 4 | Quartile 1 | Quartile 2 | Quartile 3 | Quartile 4 |
| CBS Decile 1 | 1 | 2 | 4 | 7 | 1 | 2 | 3 | 4 |
| CBS Decile 2 | 3 | 5 | 8 | 11 | 5 | 6 | 7 | 8 |
| CBS Decile 3 | 6 | 9 | 12 | 15 | 9 | 10 | 11 | 12 |
| CBS Decile 4 | 10 | 13 | 16 | 18 | 13 | 14 | 15 | 16 |
| CBS Decile 5 | 14 | 17 | 19 | 20 | 17 | 18 | 19 | 20 |

Each cell = Quarter-decile. Numbers indicate bad rate per cell.

| Account Segments | JSS Quartiles (Cell Selection Strategy: Diagonal) | | | | CBS Quartiles (Cell Selection Strategy: Linear) | | | |
|---|---|---|---|---|---|---|---|---|
| | Quartile 1 | Quartile 2 | Quartile 3 | Quartile 4 | Quartile 1 | Quartile 2 | Quartile 3 | Quartile 4 |
| CBS Decile 1 | 6.36% | 5.67% | 5.54% | 4.24% | 5.20% | 6.47% | 5.14% | 4.88% |
| CBS Decile 2 | 6.26% | 4.23% | 4.75% | 3.61% | 5.29% | 5.62% | 3.67% | 4.44% |
| CBS Decile 3 | 4.23% | 3.90% | 2.82% | 2.34% | 2.73% | 3.88% | 3.80% | 3.08% |
| CBS Decile 4 | 3.36% | 2.55% | 1.53% | 1.67% | 2.39% | 2.14% | 2.51% | 2.09% |
| CBS Decile 5 | 2.70% | 2.24% | 1.73% | 1.36% | 2.36% | 2.74% | 1.23% | 1.59% |

FIGURE 36

Income Risk Based Credit Score (its embodiment as JSS) versus traditional credit score (its embodiment as CBS score) for payment default risk:

JSS Produces Better Residual Bad Rates

| Total Accounts | JSS+CBS Bads | CBS Bads | JSS+CBS Residual Bad Rate | CBS Residual Bad Rate | Extra Bad Accounts | Extra Bads as a % of total bads |
|---|---|---|---|---|---|---|
| 28,679 | 1,019 | 1,019 | 3.55% | 3.55% | - | 0.00% |
| 27,245 | 927 | 943 | 3.40% | 3.46% | 16 | 1.57% |
| 25,811 | 845 | 841 | 3.27% | 3.26% | (4) | -0.39% |
| 24,377 | 756 | 773 | 3.10% | 3.17% | 17 | 1.67% |
| 22,943 | 676 | 704 | 2.95% | 3.07% | 28 | 2.75% |
| 21,509 | 616 | 623 | 2.86% | 2.90% | 7 | 0.69% |
| 20,075 | 556 | 548 | 2.77% | 2.73% | (8) | -0.79% |
| 18,641 | 495 | 485 | 2.66% | 2.60% | (10) | -0.98% |
| 17,207 | 428 | 437 | 2.49% | 2.54% | 9 | 0.88% |
| 15,773 | 373 | 389 | 2.36% | 2.47% | 16 | 1.57% |
| 14,340 | 322 | 334 | 2.25% | 2.33% | 12 | 1.18% |
| 12,906 | 271 | 289 | 2.10% | 2.24% | 18 | 1.77% |
| 11,472 | 231 | 249 | 2.01% | 2.17% | 18 | 1.77% |
| 10,038 | 193 | 209 | 1.92% | 2.08% | 16 | 1.57% |
| 8,604 | 155 | 173 | 1.80% | 2.01% | 18 | 1.77% |
| 7,170 | 122 | 139 | 1.70% | 1.94% | 17 | 1.67% |
| 5,736 | 99 | 112 | 1.73% | 1.95% | 13 | 1.28% |
| 4,302 | 68 | 70 | 1.58% | 1.63% | 2 | 0.20% |
| 2,868 | 43 | 36 | 1.50% | 1.26% | (7) | -0.69% |
| 1,434 | 19 | 20 | 1.33% | 1.39% | 1 | 0.10% |

Income Risk Based Credit Score (its embodiment as JSS) versus traditional credit score (its embodiment as CBS score) for payment default risk:
Cumulative Bads: JSS+CBS vs. CBS

Income Risk Based Credit Score (its embodiment as JSS) versus traditional credit score (its embodiment as CBS score) for payment default risk:

Income Risk Based Credit Score (its embodiment as JSS) versus traditional credit score (its embodiment as CBS score) for payment default risk:

FIGURE 40
Income Risk Based Credit Score (its embodiment as JSS) and its ability to predict payment default risk (delinquencies)
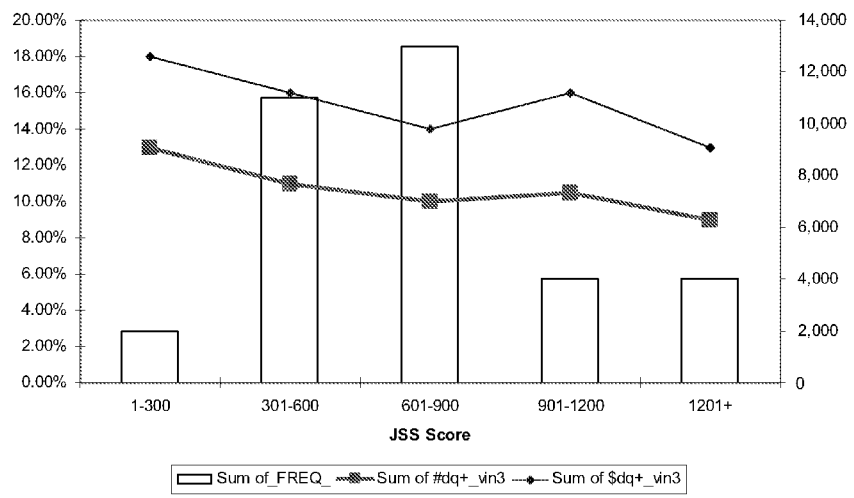
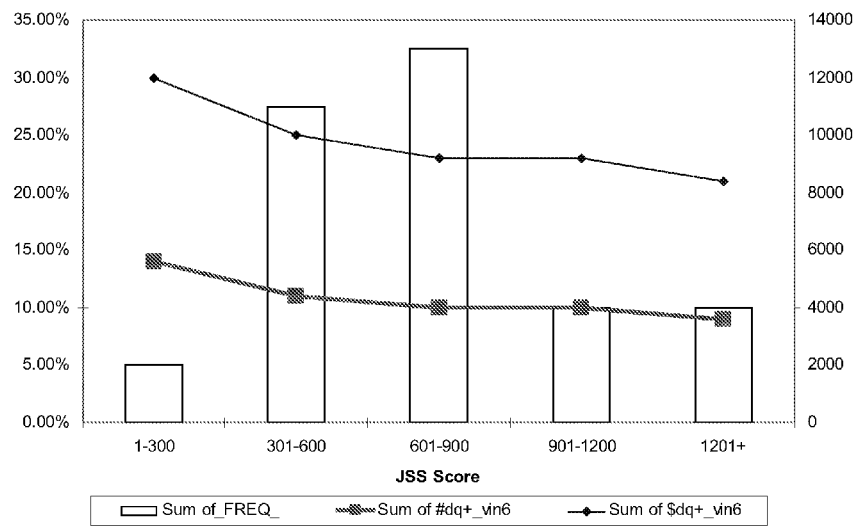

Income Risk Based Credit Score (its embodiment as JSS) and its ability to predict payment default risk (delinquencies)

Income Risk Based Credit Score (its embodiment as JSS) versus traditional credit score (its embodiment as Riskscore) and their ability to predict payment default risk (first payment default or FPD defarult rates)

Income Risk Based Credit Score (its embodiment as ISS) and its ability to predict customer conversion rate

SYSTEM AND METHOD FOR PREDICTING CONSUMER CREDIT RISK USING INCOME RISK BASED CREDIT SCORE

RELATED APPLICATION

This claims the benefit of U.S. Provisional Application No. 61/247,421, filed Sep. 30, 2009, the entire contents of which are incorporated herein by reference.

BACKGROUND OF THE INVENTION

1. Field of the Invention

The present invention relates generally to the field of consumer credit scoring and credit risk prediction, and, more particularly, the present invention relates to the utilization of a novel income risk based credit scoring system using an individual's unemployment risk probability and income loss risk, and factoring the impact of economy on consumers' credit risk, to increase the accuracy of consumer credit risk forecasts resulting in credit loss reductions, increase in acquisitions, increase in portfolio credit quality, and an increase in profitability in the consumer credit industry.

2. Description of the Background

Individual borrowers pay their loans or loan installments when they have the ability to pay. The ability to pay largely depends on a person's disposable income. And if a person's disposable income disappears due to the loss of his job, or due to income reduction resulting from a pay cut or a change in job or due to underemployment, then the person assumes a much higher risk of defaulting on his loan repayments simply because the person has no money and therefore has no ability to pay. That is why it is critical to predict a person's ability to pay based on his future probability of loss of income or a reduction in income in order to make a superior prediction of his creditworthiness. Today, the standard approach to credit scoring is through traditional credit scores but the problem is that they are increasingly becoming inaccurate, simply because they don't predict future ability to pay. They are essentially reactive scores, meaning they change after borrowers default, and do not factor changes in the economy, and purely rely on credit histories and consumers' past ability to pay.

The problem this invention solves is that traditional credit bureau scores are not very accurate and have many significant limitations. Specifically, there are 3 problems with credit bureau scores. First problem is that credit bureau scores are reactive scores. The reason credit bureau scores are reactive is because they change only after the borrower defaults. The second problem is that credit bureau does not consider borrowers' income risk and that is why they can never be very accurate in predicting credit risk. The third problem with credit bureau scores is that they cannot score about 70 m people. This is because credit bureau scores can only be generated for people, who have long credit histories, but some 70 million people do not have credit histories or have very limited credit histories, and hence credit bureau model cannot score them. This means most lenders are not able to do business with these 70 million people.

To appreciate credit bureau score limitations let's take a look at credit bureau factors. The five key factors and their contribution to the overall credit bureau score are: payment history (35%), amount owed (30%), length of credit history (15%), types of credit (10%), and new credit (10%). As can be seen, credit bureau scores are entirely based on past credit behavior and does not factor future income risk or impact of economy on consumer's ability to pay. So, essentially credit bureau score is a measure of past credit risk and would work only for those people whose risk profile and income risk has not changed or been affected because of changes in the economy and business conditions.

A person is only able to repay a loan if the monetary sources are available which is usually dependent on consumer's continuance of present income and on consumer's intent to pay; thus, in effect the consumer's total credit is a function of both the willingness to pay and the "ability to pay." Since an individual's ability to pay is directly related to continuance of income, defining that individual's credit risk using income loss risk and unemployment probability greatly increases the accuracy and effectiveness of credit risk prediction. Although, the consumer's income risk is a critical driver of credit risk it is not a factor in existing credit bureau scores.

The ability to pay is a critical factor in predicting credit risk, because a borrower must have both the willingness and the ability to repay a loan. If any one factor is missing then lenders will not get their payment. So the bottom line is that credit risk equals willingness to pay plus the ability to pay. And while it is useful to know the past willingness and ability, what really matters is the future willingness and future ability. And the future ability to pay depends on the borrower as well as the economic conditions, just as 'accident risk' depends on both the 'driver' and the 'driving conditions'. Since ability to pay is such a critical driver of consumer creditworthiness, considering consumers' income risk and ability to pay in addition to the credit histories and payment histories will greatly enhance the predictive power of credit scoring models.

Consumer credit has traditionally been regarded to have three components: Collateral, Capacity, and Character (or Willingness). However, there is no collateral in cases of unsecured loans such as credit cards, capacity is equated with current income level, and willingness is judged based on past payment behavior. While credit bureau scores are based on the idea that a borrower's past payment behavior is indicative of their future payment behavior, a person's previous ability to pay is a less reliable predictor of future ability to pay compared to future continuance of income. Therefore existing credit scoring models fail to take into account consumer's true "capacity" to pay or ability to pay which depends on consumer's future continuance or income risk. But the present invention addresses this unmet need by providing a method to determine a consumer's income risk and the dependent credit risk.

As of September 2009, the Applicant is the only provider of income risk based credit score in the industry. No other invention has been able to so accurately calculate an unemployment probability and ability to pay and, more importantly, incorporate income risk into a credit scoring system to offer new, better credit risk insights resulting in effective and accurate consumer credit risk predictions.

One embodiment of the income risk based credit score is the Job Security Score which is generated by a novel credit scoring system complaint with the Equal Credit Opportunity Act's (ECOA) Regulation B. As defined in Regulation B, a "credit scoring system" is a system that evaluates an applicant's creditworthiness mechanically, based on key attributes of the applicant and aspects of the transaction. It determines, alone or in conjunction with an evaluation of additional information about the applicant, whether an applicant is deemed creditworthy. 12 C.F.R. §202.2(p)(1).

Also, the Job Security Score qualifies as "an empirically derived, demonstrably and statistically sound, credit scoring system" as defined by Reg B. The Regulation B states:

To qualify as an empirically derived, demonstrably and statistically sound, credit scoring system, the system must be—
  i. based on data that are derived from an empirical comparison of sample groups or the population of creditworthy and noncreditworthy applicants who applied for credit within a reasonable period of time;
  ii. developed for the purpose of evaluating the creditworthiness of applicants with respect to the legitimate business interests of the creditor utilizing the system (including, but not limited to, minimizing bad debt losses and operating expenses in accordance with the creditor's business judgment);
  iii. developed and validated using accepted statistical principles and methodology; and
  iv. periodically revalidated by use of appropriate statistical principles and methodology and adjusted as necessary to maintain predictive ability.

Id. The regulation goes on to state:

A creditor may use an empirically derived, demonstrably and statistically sound, credit scoring system obtained from another person or obtain credit experience from which to develop such a system. Any such system must satisfy the criteria set forth in paragraph (p)(1)(i) through (iv) of this section; if the creditor is unable during the development process to validate the system based on its own credit experience in accordance with paragraph (p)(1) of this section, the system must be validated when sufficient credit experience becomes available.

The current system predicts consumer creditworthiness by predicting an individual's income risk and by empirical comparison of income risk and credit experiences of a large population of creditworthy and non-creditworthy applicants or accounts. The key difference between traditional credit scores and current invention is that traditional credit scoring systems compare an applicant's credit profile to credit experiences of others whereas the current scoring system compares an applicant's income risk profile to credit experiences of others. Consumers who have more stable income outlook because they have more job security are likely to be more creditworthy, which is proven by the fact that unemployed individuals default on their payment obligations a lot more than employed individuals. The current invention uses an innovative approach of using consumers' income risk in predicting their credit risk and has created a credit scoring system through empirical comparison and analysis of income loss experiences and credit default experiences.

Current bureau scoring models only take into account previous consumer credit transactions when creating a credit score and do not attempt to factor a key driver of credit risk which is lack of sufficient income. Current credit bureau scoring models predominantly use payment history, amounts owed on account, length of credit history, new credit inquiries, and types of credit used, and do not use probability of income continuance. They have not yet developed a forecasting method capable of generating future income predictions of consumers, and therefore, have no way to analyze a consumer's ability to pay. In addition, existing credit scoring models are unable to score consumers with little-to-no credit history, leaving a wide gap in its current scoring capabilities.

Other companies have attempted to supplement the credit scoring bureaus, but none have succeeded to the level of the current invention. This is due to the fact that all are based on credit data and payment data. None include a forecast of future income risk or unemployment probability as a factor in consumer credit risk assessment. Thus, they are restricted in their ability to make accurate credit risk predictions.

The current invention is a novel income loss based credit scoring model that is different from all known credit scoring models, and was constructed based on the personal data, employment and unemployment histories, and financial stress experiences of individuals from a national sample between hundred thousand and one million people and credit behavior data from actual borrowers numbering between one million and fifteen million borrowers. It takes into account the impact of the changing economy on consumers' income risk and the dependent credit risk by considering: national and local macroeconomic attributes such as the gross domestic product, unemployment rates, retail sales, inflation, bankruptcies, foreclosures, money supply, and energy prices; and attributes that pertain to a group of individuals, such as type of employer and occupation; data for individuals, such as income, years at present job, and years at present residence; and by finding patterns and mathematical relationships between historical macroeconomic data and economic conditions and individuals and their historical income risk, ability to pay, and credit risk. The model uses various modeling techniques to predict the likelihood of unemployment and credit risk up to thirty-six months in advance. The income risk based credit score can be used alone or in conjunction with other scoring models, e.g. FICO, for functions such as deciding whether to grant or deny a credit, setting credit limits, or reviewing the performance of an existing account.

Traditional credit scores, such as FICO scores, are generated entirely from the credit bureau's files, but Job Security Score primarily uses consumer's loan application data to generate income loss risk and then to make a prediction of consumer's creditworthiness. Since, the income risk based credit score does not rely on credit histories it can score everyone including those consumers who have limited or no established credit histories. Currently in the U.S. there are 40 to 70 million consumers who do not have any credit histories or have very little credit histories which means that traditional credit bureau scores cannot be meaningfully computed for them. However, the income risk based credit score and one of its embodiments, the Job Security Score, is easily able to score all these consumers. This allows lenders to offer credit to "thin-file" and "no-file" applicants. For consumers with sufficiently long credit histories and meaningful credit bureau scores, the income risk based credit score can still be used in combination with FICO or credit scores to add new risk insights and to improve the accuracy and effectiveness of consumer payment default evaluations.

The total yearly consumer credit card losses in the U.S. amount to over 80 Billion dollars. Thus, there is a great need for more accuracy in consumer credit risk prediction. One embodiment of the income risk based credit score, the Job Security Score, improves risk prediction by up to 30%, where even a 5% reduction in credit losses will save the credit card industry $4.1 billion annually (See FIG. 9). The increased ability of lenders, businesses, and others to forecast the consumer's ability to pay and credit default risk will enhance profitability by reducing losses, improving acquisitions and marketing, and by early identification of high default risk consumers.

SUMMARY OF THE INVENTION

Every year, millions of consumers face financial hardships due to income disruption events such as unemployment, income loss, and income reduction. And a majority of these financially stressed consumers default on their payment obligations related to credit card loans, auto loans, mortgage loans, student loans, and other personal loans; fall behind on various kinds of insurance premium payments including life insurance, medical insurance, auto insurance and home insurance; and also are unable to pay their rental, medical, utilities payments and other purchases, because the economy and business conditions have impacted their income continuity or has caused loss of income leaving them with diminished ability to pay and transforming them into high credit risk consumers. Therefore income risk, or income disruption risk, is a very important component and driver of consumer credit risk.

While income risk drives consumers' ability to pay, which in turn affects consumers' creditworthiness, none of the existing credit scoring models use income risk to predict credit risk, and hence they are incomplete and inaccurate, and this has been clearly proved in the current recession where traditional credit scoring models have failed and credit losses have doubled or tripled over expected loss rates simply because traditional credit scoring models and conventional credit bureau scores have not been able to quantify income risk in a poor and volatile economy, and millions of consumers with high credit scores have defaulted because they experienced an income disruption event which adversely impacted their ability to pay and decreased their creditworthiness.

Hence, there is a great need for more sophisticated consumer credit risk assessment model that considers consumers' income risk. And therefore the present invention of income risk based credit score is not only a novel method of predicting credit risk arising out of income risk but it is also solves a major problem faced by the credit scoring and the lending industry of making better, complete credit risk predictions and minimizing credit losses.

Using the income risk based credit score as a primary decision score or in combination with traditional credit scoring models is much needed by the credit industry today than ever before because tens of millions of jobs are lost every year (over 20 million jobs were lost in 2008), primarily due to economic and business conditions. And, about two-thirds of all unemployed face some financial difficulties and develop an increased credit default risk, and a much higher percentage of unemployed actually default on their debt obligations compared to the employed. In fact, job loss is the number one reason for credit and mortgage default. With the use of income risk based credit score, businesses gain the ability to understand customers' risk of becoming unemployed and defaulting on payments, allowing them to better target their products and services to consumers that best fit with their risk tolerance and strategic goals.

One preferred embodiment of the current invention is the ability to generate consumer specific unemployment probabilities and income risk probabilities by collecting consumers' personal profile data including employment data, unemployment data, financial stress history; economic data; and consumers' credit default data. This preferred embodiment solves the problem of identifying, segmenting, and targeting consumers with desired level of income risk in order to create better prospect scores for increasing response rates and improving marketing efficiencies.

Another significant limitation that the Applicant's invention overcomes is that the current scoring models are reactive, and not truly predictive, since they change or react after the consumer demonstrates good or bad credit behavior, so in effect existing models do not predict credit behavior but merely reflect them and hence are lagging indicators of consumer credit risk. Essentially, credit bureau scores are retrospective and can generally have up to 12 month lag time in capturing an increase or decrease in consumer's default risk simply because they change only after the consumer defaults on payments or shows some negative credit behavior, or when the consumer demonstrates good payment behavior over a long period of time, and it the whole process of collecting, processing, updating bureau databases, refreshing scores on a periodic process, and sending them to lenders can be tedious, error-prone and time consuming; and hence such lagging and delayed credit risk insights could only be of limited use for lenders. In effect traditional credit bureau scores tend to make straight line projections of consumers credit risk, that is, good consumers will remain good and bad consumers will remain bad in the near term. However, that is not true for many consumers and good consumers can go bad quickly and bad consumers can become good consumers in a very short time, and such consumers will not be properly identified and scored by traditional scoring models because of their design limitations.

Another significant limitation that the Applicant's invention overcomes is that the current scoring models are unable to score approximately 40 to 70 million "thin-file" and "no-hit" credit card portfolios. This inability to score 70 million consumers due to a lack of sufficient information is a fundamental flaw of the current credit scoring systems. Hence, a more comprehensive and accurate credit model that not only considers past willingness and past ability to pay, but also takes into account the future ability to pay is greatly needed and provided by the income risk based credit score. Applicant's invention does not require consumers' credit histories and can score any individual thereby providing a 100% scoring coverage.

The income risk based credit score offers many innovative and significant improvements over traditional credit scores because: it does not rely histories which may not be accurate and current since collection of credit transaction data is a tedious and error prone process which is evidenced by the fact that a majority of credit bureau reports have errors and all credit bureaus have different data on the same individual and that in most instances they come up with different credit scores for the same individual; it considers the impact of the economy on consumer's future income and predicts income risk which is not a factor in current credit scoring models; it is updated monthly using the latest economic data since economy impacts consumers' future income; and it can score every individual irrespective of their credit histories.

The income risk based credit scoring model's databases are updated monthly by using as updated assessment of economic conditions and how the new conditions are going to impact consumers future income or income risk, allowing the most current information to be used by lenders, businesses, and others. Thus, instead of waiting for negative items to appear on a consumer's credit report, the income risk based credit score quantifies the source of credit risk, and that is the interaction between the economy and consumer's income prospects, enabling lenders to get an accurate assessment of consumer's potential for defaulting on a payment.

In another preferred embodiment of the income risk based credit score, the Job Security Score is usable as a prospect score which predicts response rates and improves acquisitions by allowing lenders and businesses to identify better prospects who are more likely to respond to a marketing offer and become better consumers. When the Job Security Score is combined with other scores, the quality of predictions increase and therefore businesses can better target their products and services to consumers that fit best with their ability to pay.

In alternative embodiments, the present invention of income risk model may also involve the use of input variables such as age; personal income; total debt; debt ratio (debt/available debt); number of times delinquent in last two years; savings account information (if one exist); residency (city, state, and zip code); years at current residence; own/rent status; total yearly income; highest level of education; education discipline/concentration; year attained; educational institution; years of full time work experience; current employer; length of time with present employer; self-employment (if any); part-time/full-time status; work city, state and zip code; job occupation area; employer's industry (name, SIC code); and total employees at place of work.

In short, Applicant provides a comprehensive consumer future behavior prediction model that employs a number of novel methods to accurately forecast and implement the ability to pay component in consumer credit risk scoring models and to increase accuracy of prospect scoring models by predicting income risk of consumers. The income risk based credit score alone or in combination with credit bureau scores, e.g. FICO, and prospects scores will lead to an enhanced power to discriminate and segment consumers, improving profitability for businesses. By using the income risk based credit score, the total dollar losses due to greater identification of potential charge-off/bankrupt accounts will decrease, the good accounts volume will increase, and the portfolio performance will improve. By using the income risk based credit score, decisions on decreasing the credit line for these accounts can be made before these accounts become problematic and loss prone. Similarly, using the combined income risk based credit score and credit bureau scores, fewer good accounts will be targeted for a reduction in credit line decreases. Good accounts can also be granted credit line increases due to the enhanced risk separation and discrimination. Thus, through the present invention, the Applicant uniquely addresses the missing component of accurately predicting consumers' payment default risk, or credit risk, using future ability to pay using income risk, allowing credit scoring models to make better, accurate determination of consumers' credit risk.

DESCRIPTION OF THE DRAWINGS

For the present invention to be clearly understood and readily practiced, the present invention and its embodiments will be described with the following figures, wherein like reference characters designate the same or similar elements, which figures are incorporated into and constitute part of the specification, wherein:

FIG. 3 is a table showing the consumer payment risk matrix;

FIG. 10 describes the limitations of traditional Credit Bureau Scores and shows the components of one of its embodiment, the FICO score;

FIG. 11 describes the key features and limitations of alternative credit scores and lists major alternative scores in existence today;

FIG. 12 is a table describing existing credit scoring models and their limitations;

FIG. 15 is a table showing superior risk segmentation capability of Income Risk Based Credit Score over traditional credit score for payment default risk;

FIG. 23 is a table comparing the predictive power of Income Risk Based Credit Score (its embodiment as JSS) and its effectiveness as a credit score using statistical analysis (KS stats);

FIG. 26 is a chart for Income Risk Based Credit Score (its embodiment as JSS) and traditional credit score (its embodiment as VAN score) comparing payment default risk (loss rate or bad rate) for prescreened accounts;

FIG. 27 is a chart for Income Risk Based Credit Score (its embodiment as JSS and ISS) versus traditional response score (its embodiment as RESP and VAN SCR) for prospect scoring;

FIG. 28 shows two tables comparing K-stats for Income Risk Based Credit Score (its embodiment as JSS and ISS) and a traditional response score (its embodiment as RESP and VAN SCR) for prospect scoring;

FIG. 33 shows two charts comparing the effectiveness of Income Risk Based Credit Score (its embodiment as JSS) and traditional credit score (its embodiment as CBS score) in predicting payment default risk;

FIG. 35 shows tables comparing Income Risk Based Credit Score (its embodiment as JSS) with traditional credit score (its embodiment as CBS score) for payment default risk;

FIG. 36 is a table comparing Income Risk Based Credit Score (its embodiment as JSS) with traditional credit score (its embodiment as CBS score) for payment default risk;

FIG. 40 shows two charts showing Income Risk Based Credit Score (its embodiment as JSS) and its ability to predict payment default risk (delinquencies) in 3 months and 6 months from the time of booking the accounts;

DESCRIPTION OF THE PREFERRED EMBODIMENTS

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

Generally speaking, the present invention provides systems and methods for a novel income-risk based credit scoring system to predict consumers' credit risk by using their income risk, which is key driver of credit risk.

Consumers are able to pay their debt obligations when they have money (FIG. 3), and consumers typically rely on a steady source of income to be able to manage their financial obligations. When their source of income disappears, reduces, or is adversely impacted, which is usually because of job loss or change, then the consumer's ability to pay is diminished and their probability of payment defaults increases, which results in the fact that they become less creditworthy and present higher credit risk to their lenders.

FIG. 3 is a table showing the consumer payment risk matrix which shows that consumers make a payment if they have both the willingness and ability (301) and do not make a payment if they don't have the willingness or the ability (302 and 304) or have neither the willingness nor the ability (303).

Until recently, consumers' income risk and their ability to pay risk were not defined or included in credit scoring models (FIG. 11 and FIG. 12), making it impossible to predict a consumer's true total credit risk. FIG. 11 describes the key features and limitations of alternative credit scores (1101) and lists major alternative scores in existence today (1102). FIG. 12 is a table describing existing credit scoring models and their limitations which consist of credit bureau scores (1201), lenders' internal and custom credit scores (1202), and alternative credit scores (1203);

The present invention is the first to develop a computer implemented system for quantifying (FIG. 44) consumers' credit risk due to income loss by providing a credit scoring system using unemployment risk probability, and using income risk (FIG. 7), called the income risk based credit score (FIG. 1 and FIG. 9), of which the Job Security Score is a preferred embodiment. The Job Security Score predicts the probability of an individual defaulting on credit obligations by factoring in the probability of income loss.

Figure 44:
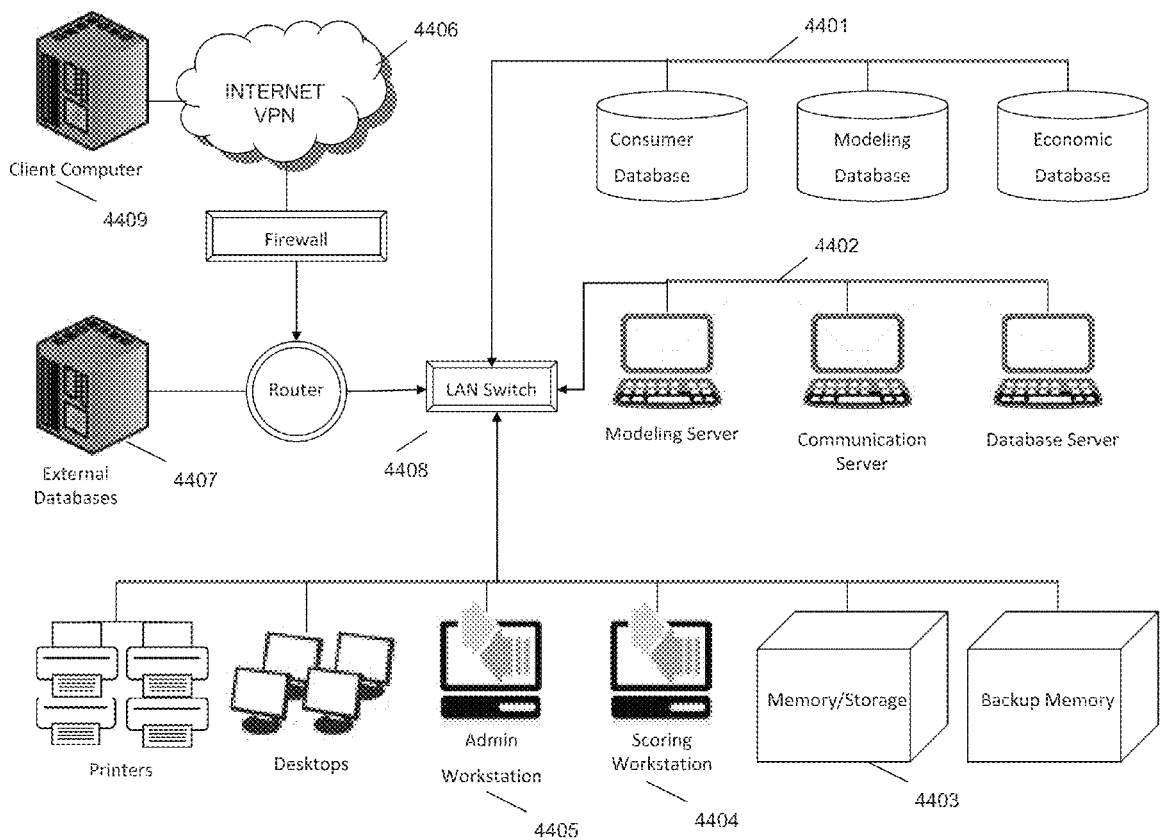
FIG. 44 is a diagram of the computer implemented system for generating and providing an Income Risk Based Credit Score.

FIG. 44 is a diagram of the computer implemented system for generating and providing an Income Risk Based Credit Score and its embodiments and it comprises of a database bank (4401) consisting of a consumer database, economic database and a modeling database; a data processing unit (4402) consisting of a modeling server, a communication server, and a database server; a memory storage unit (4403); a consumer score generating computer (4404) which produces the Income Risk Based Credit Score and its embodiments; an administrator workstation computer (4405) which manages the access, read, and write privileges to various user groups in the system connected through an internal LAN (4408); an internet and VPN connection (4406); access to client computer (4409) for exchange of consumer data and scores; and access to external databases (4407) for exchange of consumer data and scores.

Figure 1:
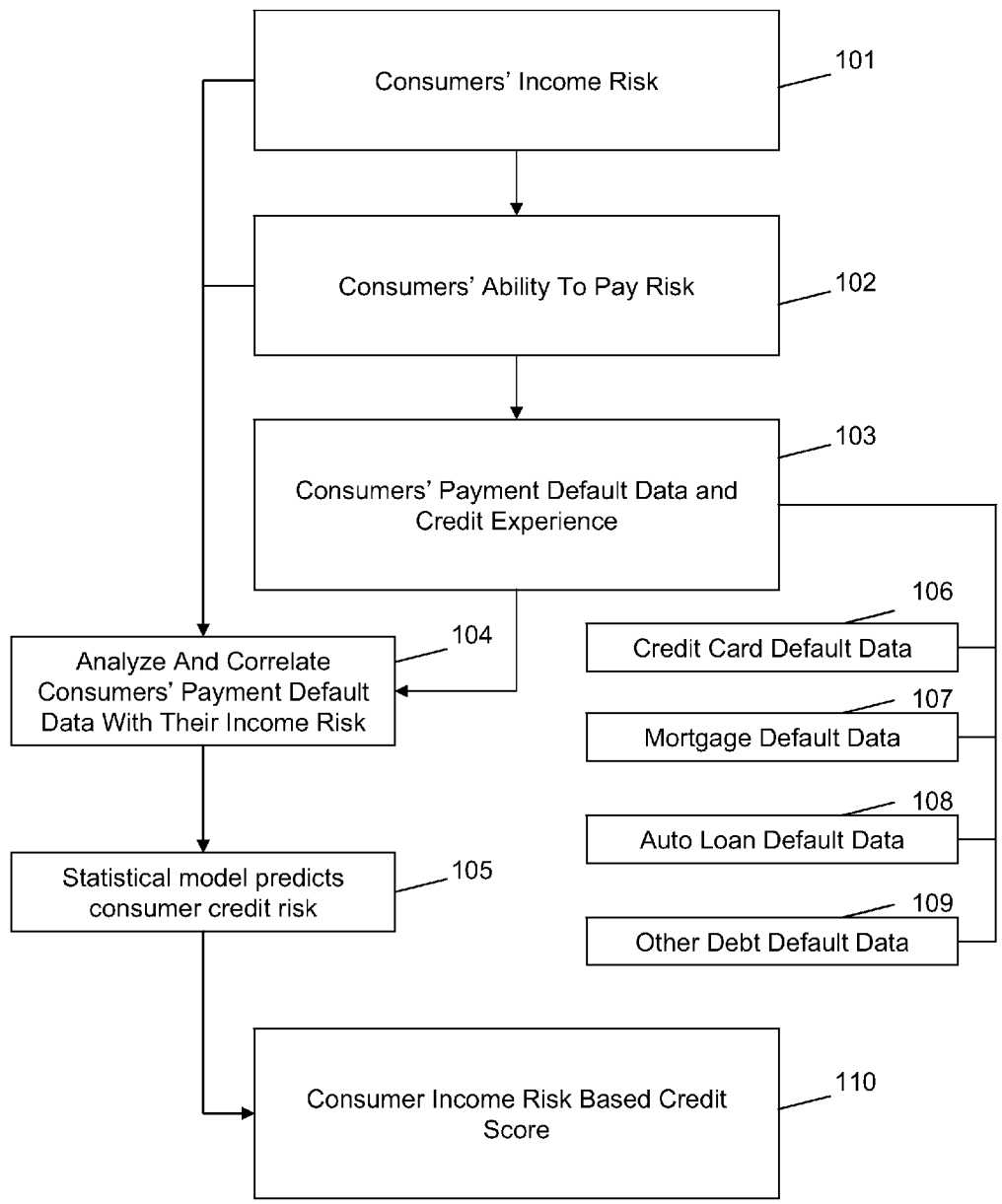
FIG. 1 is a flow chart showing the overall process of the invention.

FIG. 1 is a flow chart showing the overall process of the invention. Consumer income risk (101) is the probability that a consumer will have the necessary income to pay their debts, i.e. consumer's ability to pay risk (102). Factored into the risk calculations are the consumer's payment default data (103), which can be comprised of at least the following: credit card default data (106), mortgage default data (107), auto loan default data (108), and other debt default data (109). Block 104 depicts the step whereby the invention analyzes and correlates consumers' payment default data with their income risk using statistical models predicting consumer credit risk (105). The invention generates a consumer income risk based credit score (110).

Figure 7:
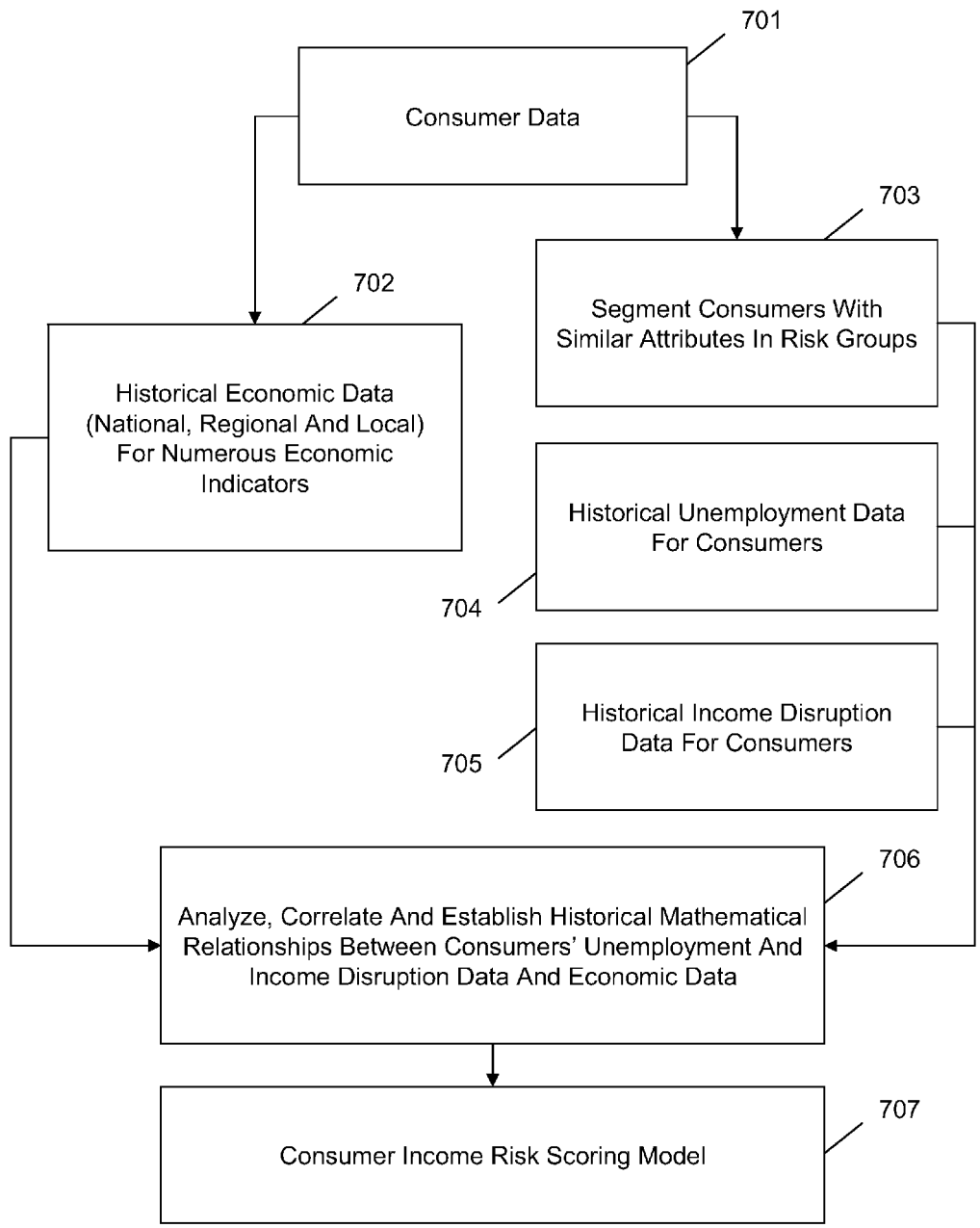
FIG. 7 is a diagram showing the steps involved in creating a consumer income risk scoring model by the invention.

FIG. 7 is a flow chart depicting the steps to be carried out in the consumer data analysis process in order to generate the novel consumer income risk scoring model (707). The consumer data (701) is used to place the consumer in a risk group, wherein consumers with similar attributes are placed in risk groups (703), and is analyzed with historical unemployment data (704), historical income disruption data (705), and historical economic data and many economic indicators (702). The invention then analyzes, correlates, and establishes historical mathematical relationships (706) between consumer's unemployment and income disruption data and economic data resulting in the consumer income risk scoring model (707).

Figure 9:
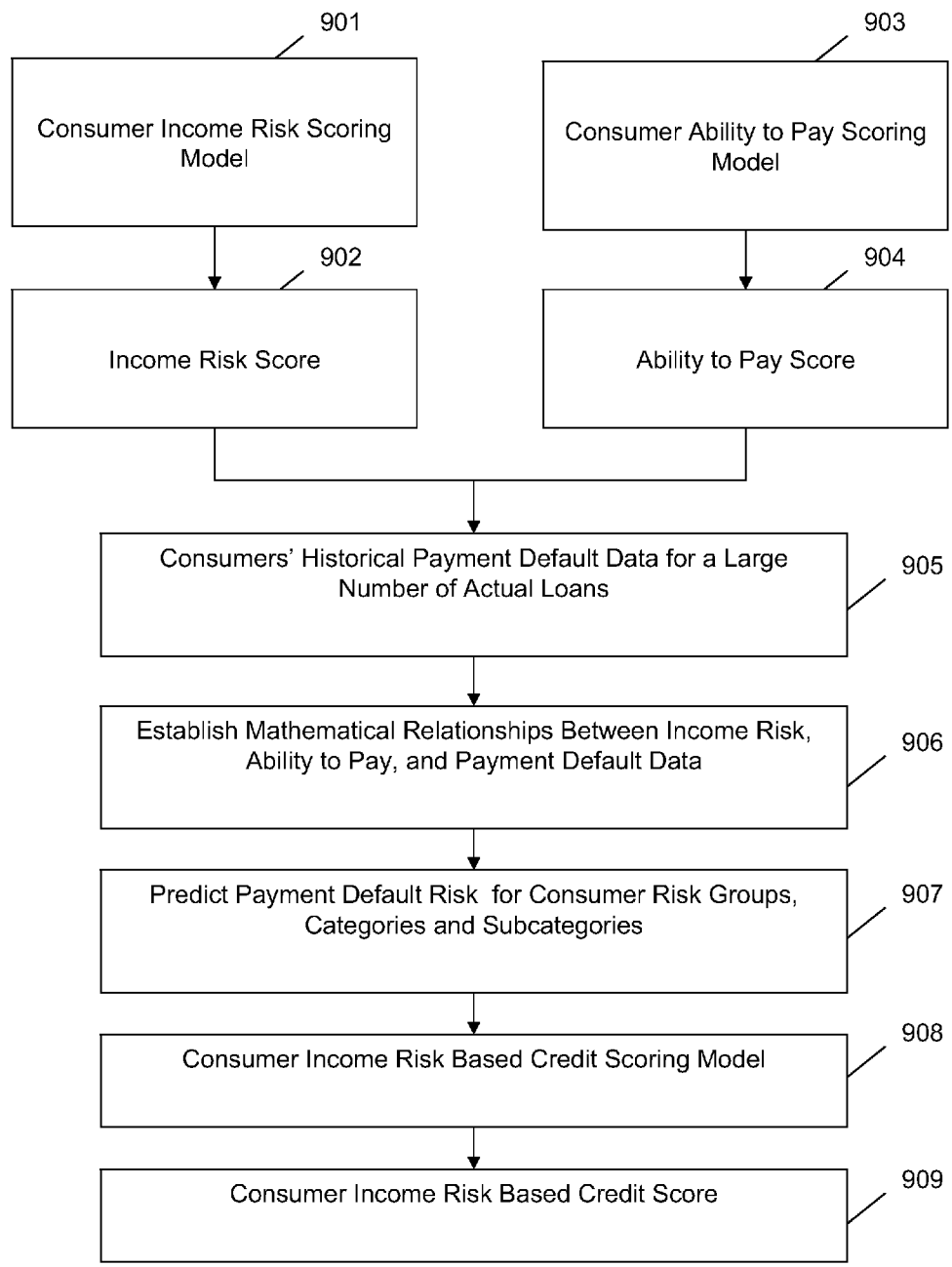
FIG. 9 is a diagram showing the steps involved in the computation of a consumer income risk based credit score.

FIG. 9 is a diagram showing the steps involved in the computation of a consumer income risk based credit score (909) which comprises of developing a consumer income risk scoring model (901) to generate an income risk score (902), developing a consumer ability to pay scoring model (903) to generate an ability to pay score (904), using consumers' historical payment default data for a large number of actual loans (905), establishing mathematical relationships between income risk, ability to pay, and payment default data (906), predicting payment default risk for consumer risk groups, categories and subcategories (907), and developing a consumer income risk based credit scoring model (908).

Figure 2:
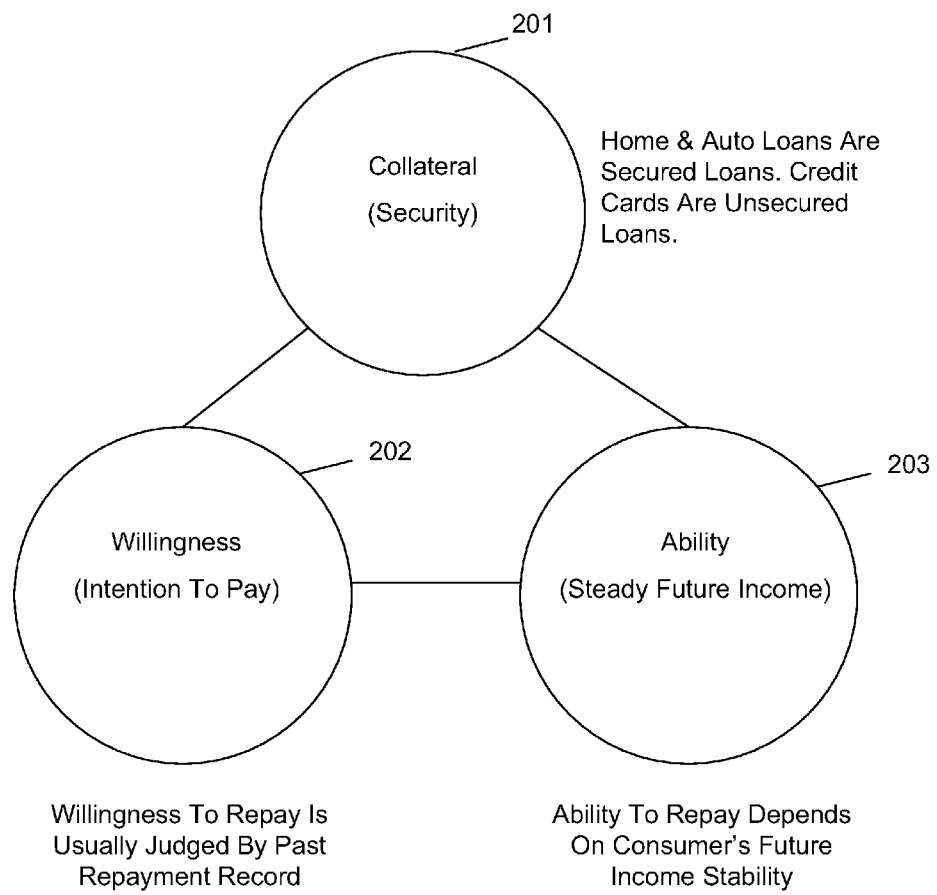
FIG. 2 is a diagram depicting key drivers of consumer credit risk of which the ability to pay is predicting by the invention.
Figure 4:
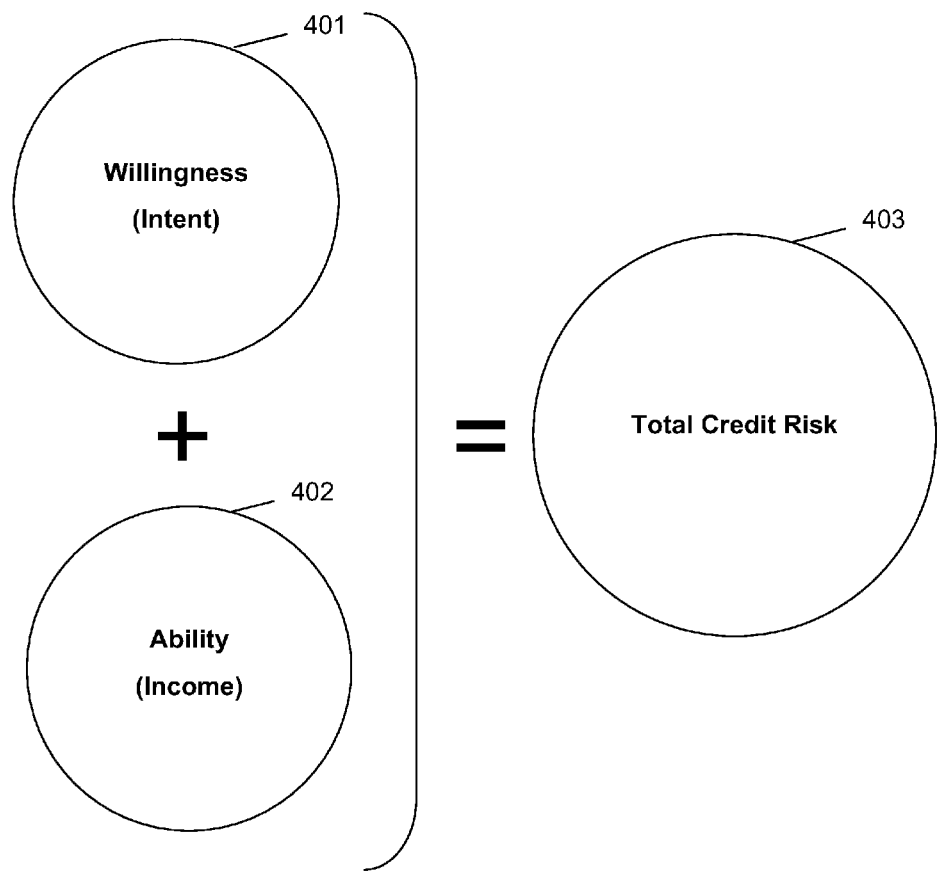
FIG. 4 is a chart demonstrating the two key drivers of consumers' total credit risk for unsecured loans.

Two fundamental concepts of consumer credit risk are the "willingness" to make repayment on a loan and the "ability" to repay (FIG. 2 and FIG. 4). While willingness can be judged by past credit behavior, the ability to pay is dependent upon external factors beyond the consumers' control (e.g. loss of income, medical problems, divorce, unemployment, etcetera) of which the probability of continuance of future income, or income risk, due to unemployment is the one of the biggest factors.

FIG. 2 is a diagram displays the three main categories of the credit risk. They are collateral (201), willingness to repay (202) and ability to repay (203), only two of which (collateral and willingness) have been previously incorporated in prior art. As credit cards are not secure loans, the willingness to pay alone will not tell the lender all the pertinent information about a consumer. A reliable indicator of future economic ability is necessary in order to determine the true credit risk of the consumer. Through the invention, the prediction of consumers' ability to pay makes lenders' decisions more accurate.

FIG. 4 is a chart demonstrating the two key drivers of consumers' total credit risk (403) for unsecured loans comprising of willingness (401) and ability (402).

Figure 19:
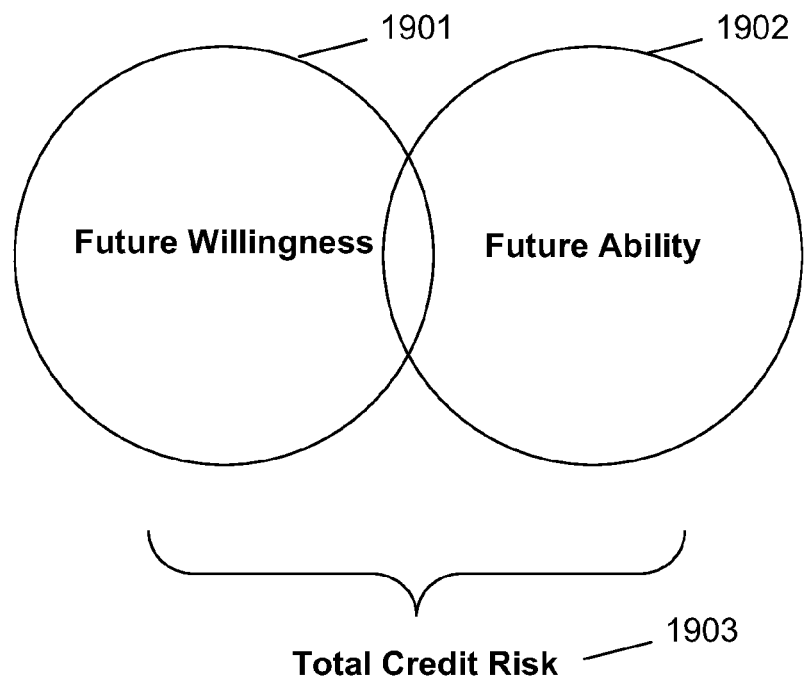
FIG. 19 is a chart which shows that credit risk truly depends on consumers' future ability to pay and their future willingness to pay.

Since credit risk is truly a measure of payment default probability in future, future willingness and future ability to pay are the real drivers of consumer credit risk than past willingness and past ability (FIG. 19). Thus, there is an unmet need in the marketplace to incorporate the ability to pay risk in credit scoring models in order to decrease credit lending risks. Recognizing this unmet need, the present invention provides a highly predictive model that predicts the ability to pay component. This results in a new consumer risk score, the income risk based credit score, of which the Job Security Score is a preferred embodiment, which predicts consumers' payment default risk using consumers' income risk as a factor.

FIG. 19 is a chart which shows that total credit risk (1903) truly depends on consumers' future ability to pay (1902) and their future willingness to pay (1901) rather than on their past willingness and past ability, and this is a critical distinction that needs to be understood because credit risk by definition is an assessment of future payment default probability so what really matters is the future willingness and ability of the consumer to make payments.

By monitoring economic conditions, and establishing relationships between economic activity, consumers' income, consumers' financial behavior, consumers' ability to pay, consumers' ability and willingness to buy, and consumers' wellbeing (FIG. 8 and FIG. 9), the present invention has been able to quantify consumers' credit risk that is dependent on their income risk, and this approach is a novel one which credit bureaus have yet to conceive.

Figure 8:
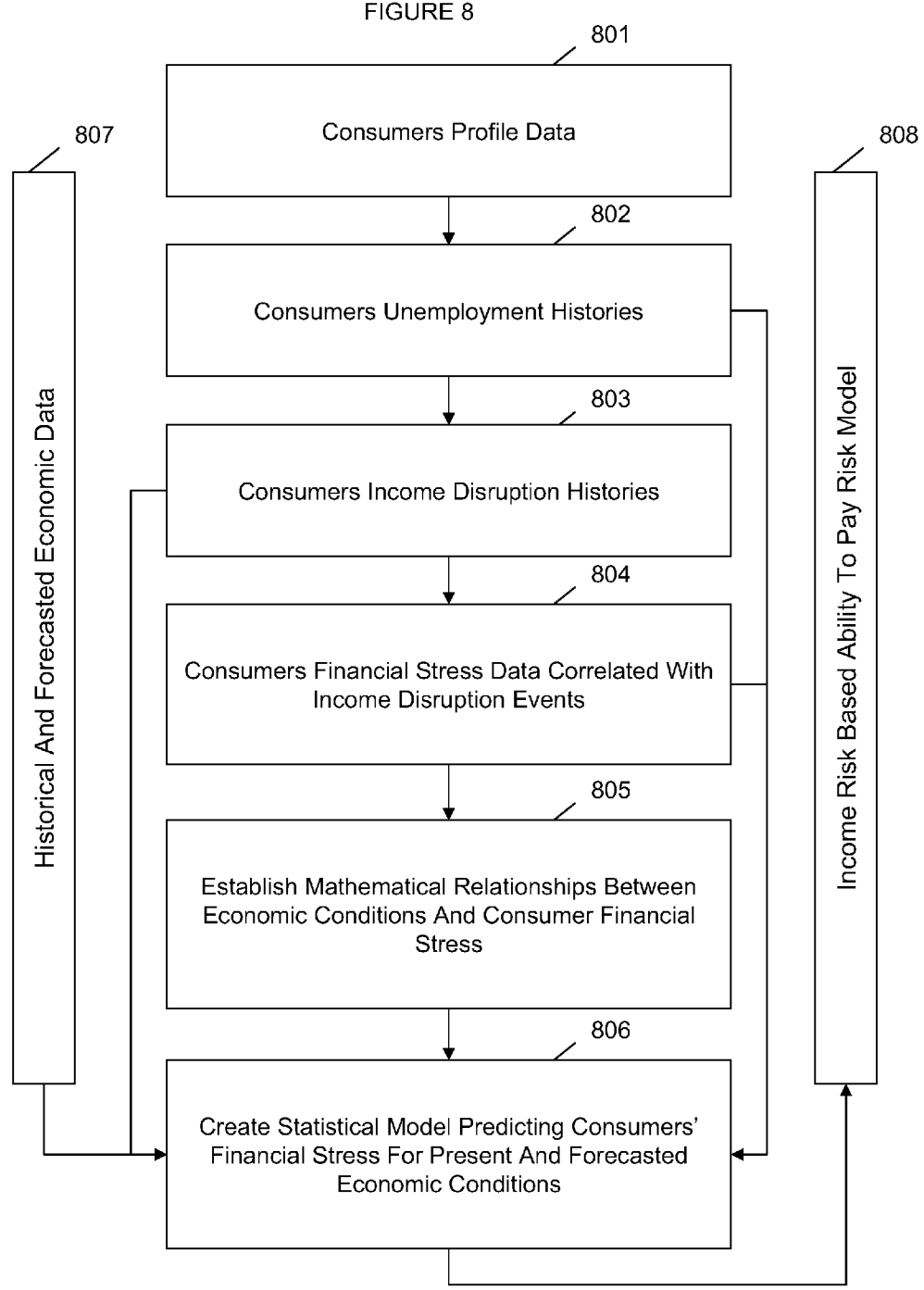
FIG. 8 is a diagram showing the steps involved in creating an income risk based ability to pay risk model by the invention.

FIG. 8 shows an exemplary capacity to generate an ability to pay risk model. Consumer profile data (801), consumer unemployment histories (802), and income disruption histories (803) were the first elements used in the process to predict consumers' income disruption risk. Then, consumers financial stress data is correlated with income disruption risk (804) and mathematical relationships are established between economic conditions and consumer financial stress (805). Said combination creates the statistical model predicting consumers' financial stress for present and forecasted economic conditions (806). Said historical and forecasted economic data (807) integrated with consumer profile data results in the income risk based ability to pay risk model utilized by the invention. Said model can then be used by lenders in making consumer credit based decisions.

Jobs and unemployment incidents are affected by the economy. During weak cycles, demand is down, whereas during strong cycles, demand is up. From an individual perspective, the job loss risk is a function of the supply and demand in the labor market, which is driven by economic conditions (FIG. 17, FIG. 18, and FIG. 20).

Figure 17:
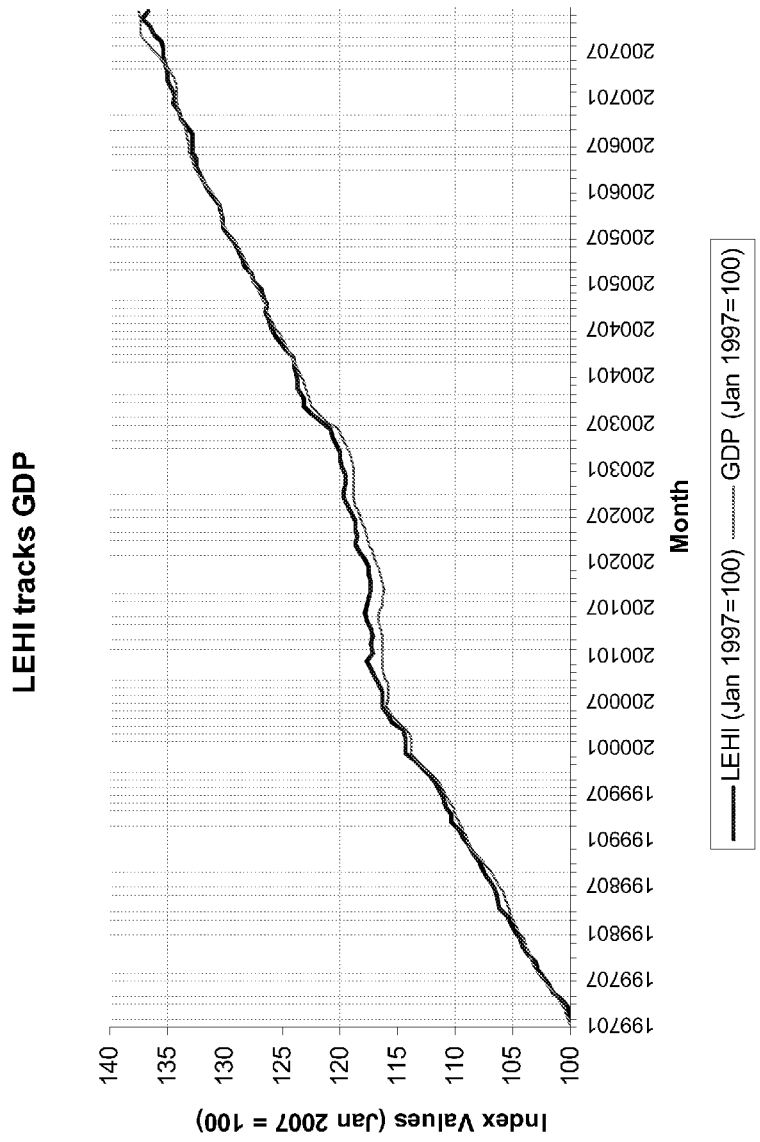
FIG. 17 is a chart illustrating LEHI's ability to track GDP because LEHI economic indicator can be used by the invention in computing Income Risk Based Credit Score.

FIG. 17 is a chart showing LEHI's (Local Economic Health Indicator) ability to track GDP as LEHI, which can be optionally used in computing Income Risk Based Credit Score. Such current economic information being updated monthly by the invention produces the most current statistics on which lenders can base their decisions. The lower the LEHI of an area, the higher the payment default risk is for that area.

Figure 18:
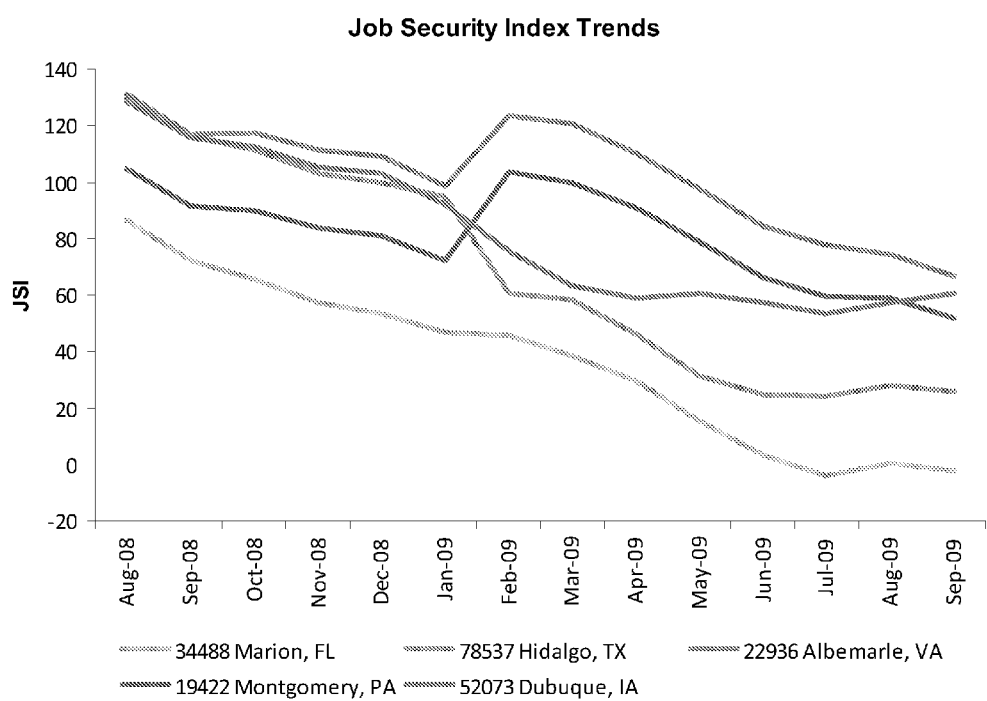
FIG. 18 is a chart showing JSI values for sample ZIP codes which can be used by the invention in computing Income Risk Based Credit Score.

FIG. 18 is a chart showing how JSI (Job Security Index) varies by ZIP codes. This is valuable information which can be used in computing Income Risk Based Credit Score.

Figure 20:
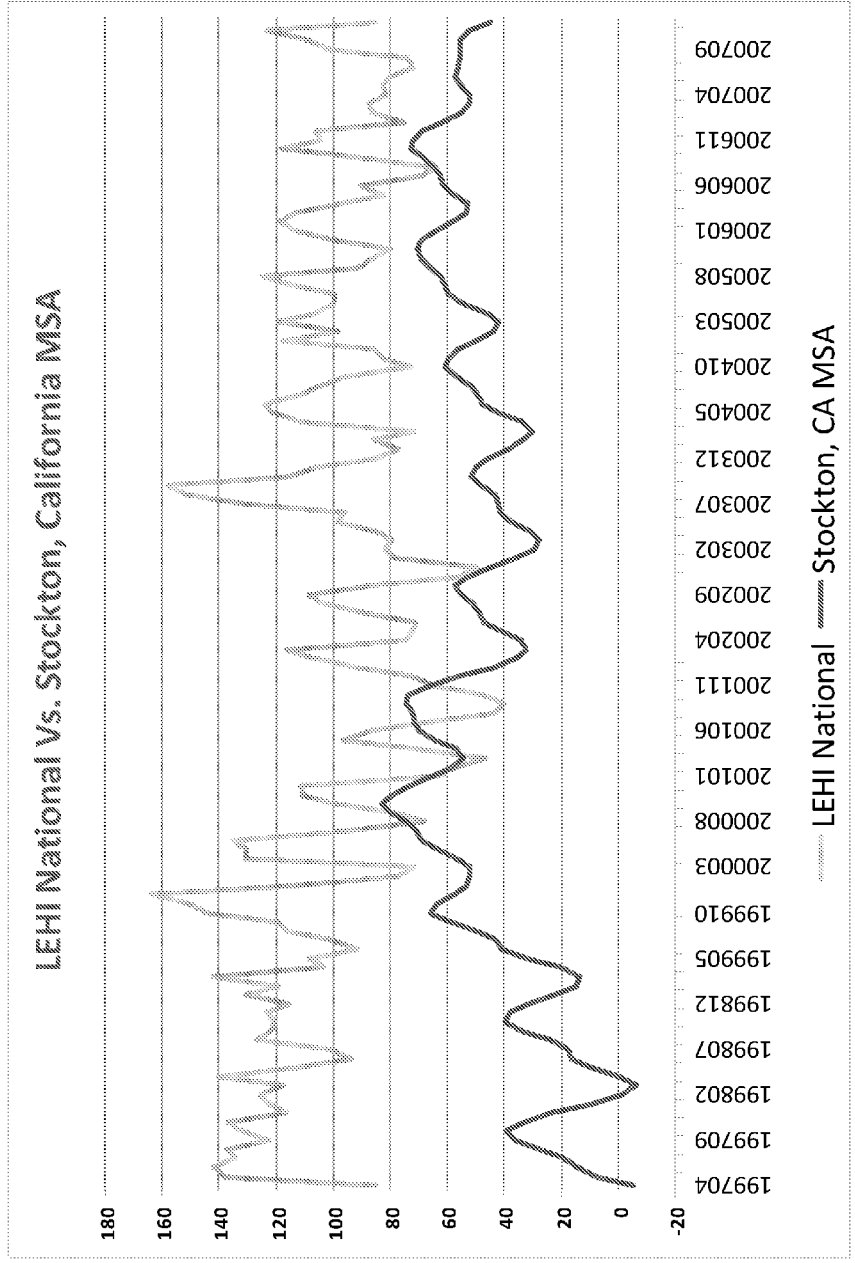
FIG. 20 is a chart showing LEHI's ability to predict local economic health.

FIG. 20 is a chart showing LEHI's ability to predict local economic health. This chart demonstrates that national economic health and regional economic health, such as for Stockton, Calif.'s MSA can be quite different and economic variations such as these can be incorporated into the present invention for predicting consumer income risk.

Figure 5:
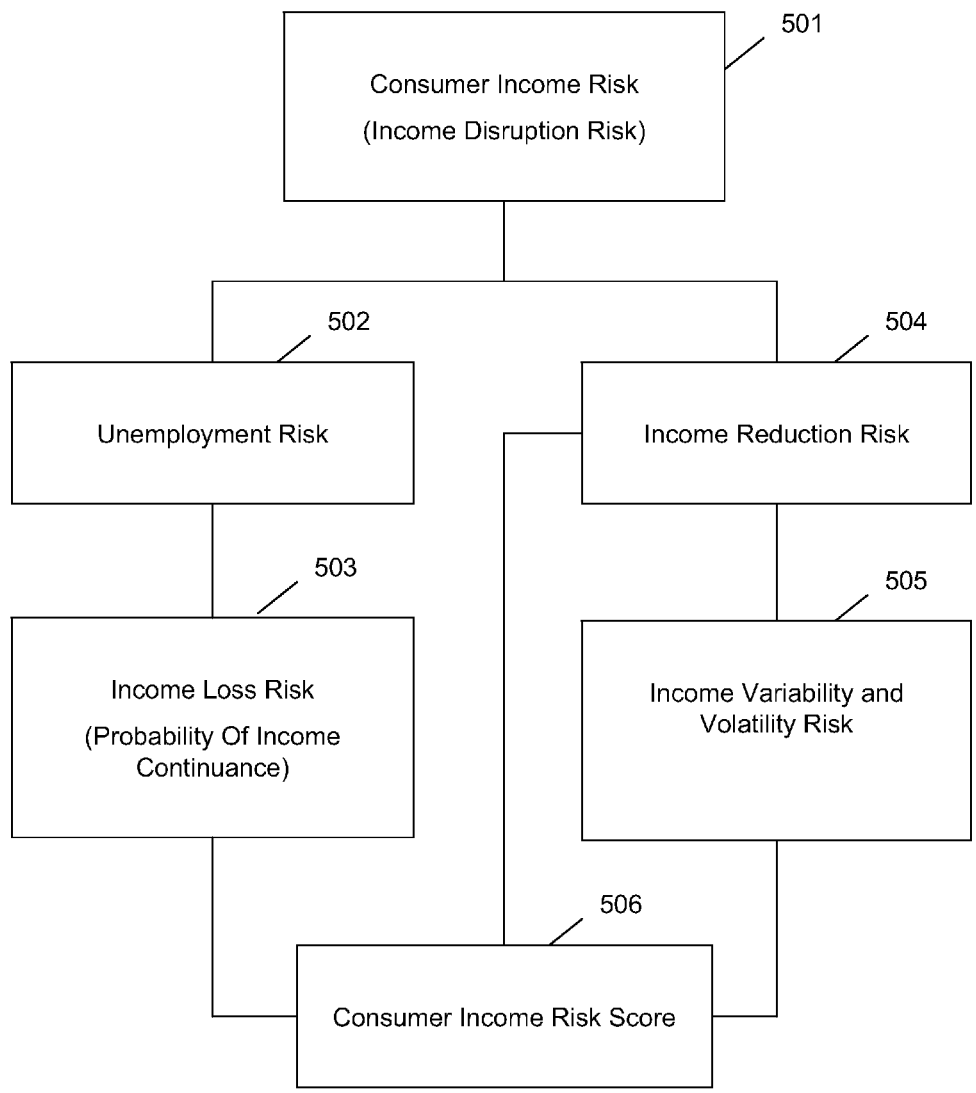
FIG. 5 depicts exemplary components of the consumer income risk score generated by the system.
Figure 6:
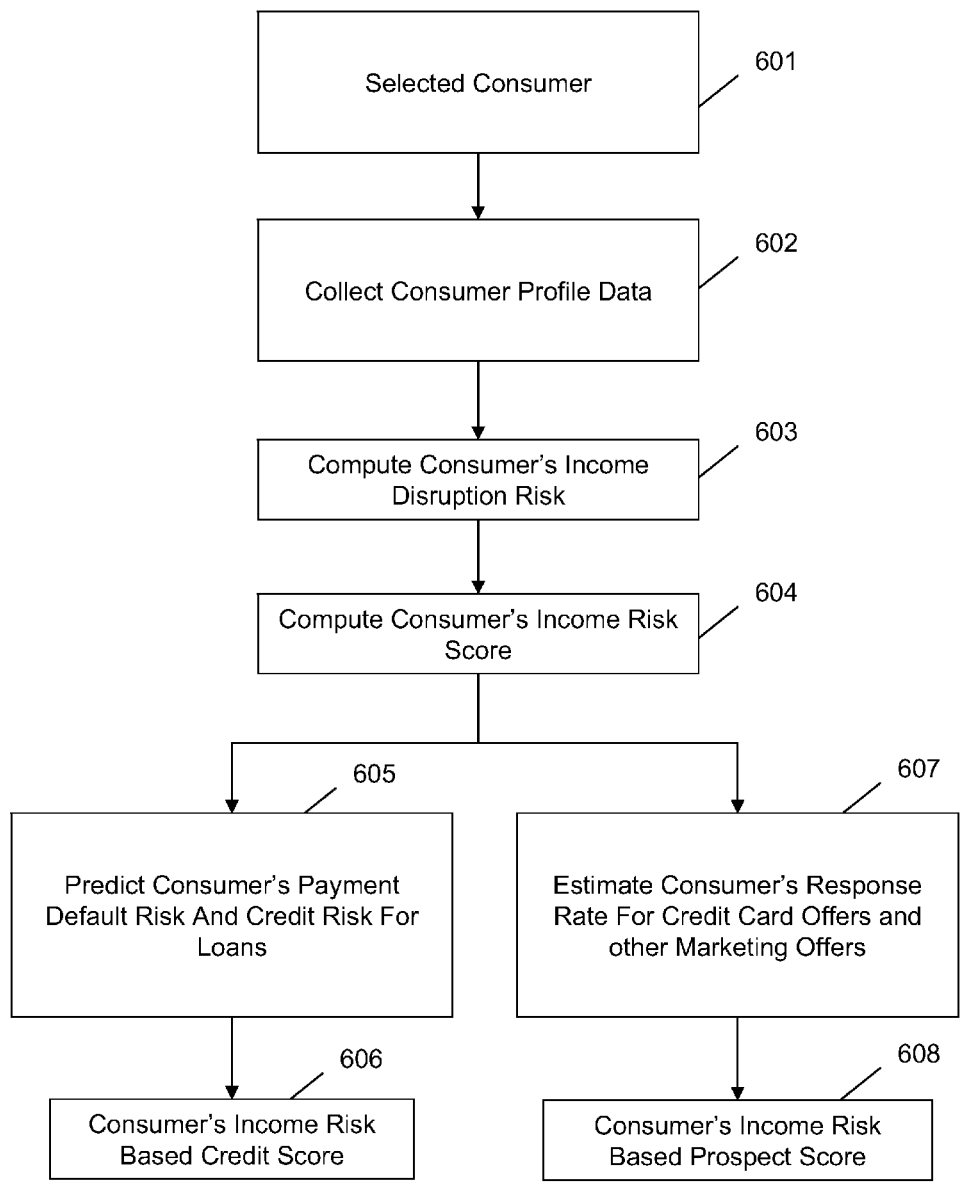
FIG. 6 is a diagram showing the steps involved in computing the consumer's income risk based credit score by the invention.

Credit bureau models do not adapt or reflect the changing economy. A delay of around 12 months or more is common in the credit bureau models and the changes are only considered as a derivative effect resulting from consumers' altered credit behavior. Yet, with a continually growing amount of consumer data being correlated into the system, Applicant predictions become more accurate, giving the lender greater ability to analyze consumer risk (FIG. 5 and FIG. 6). Thus, models that incorporate the Job Security Score will adapt quickly to reflect the latest economic conditions and forecasts, providing a more accurate and "true" credit risk prediction.

FIG. 5 depicts exemplary elements of the consumer income risk score (or income disruption risk) (501) analyzed by the invention. The consumer income risk score is the probability of the consumer's future employment (and therefore income) calculated twelve (12) months in advance and reduced into a score. Said score is a measure of the likelihood the consumer will be able to repay a debt and comes in the form of a number between −1000 to +1000, or any other numerical or non-numerical range or scale. Said score is independently assessed to each individual consumer and it varies based on consumer's income risk and credit risk. Such an accurate indicator of ability to pay for each consumer is essential is a core aspect of the current invention. The following elements are incorporated into the income risk score: The consumer's unemployment risk (502), consumer's income loss risk (503), consumer's income reduction risk (504), and consumer's income variability and volatility risk (505). The consumer's probability of a becoming unemployed and experiencing a reduction in their income is then weighted and incorporated into the final consumer income risk score.

FIG. 6 is a flow chart showing the advantages of the current invention. The invention takes a selected consumer (601) and collects consumer profile data (602) (further described in FIG. 8) on said customer. This information is then used by the method to compute the consumer's income disruption risk (603) using outputs from method described in FIG. 5. Using (601), (602), and (603), the invention computes the consumer's income risk score (604). Said credit score can be used for the following purposes: To predict consumer's payment default risk and credit risk for loans (605) through the consumer's income risk based credit score (606); and to estimate consumer's response rate for credit card offers and other marketing offers (607) through the consumer's income risk based prospect score (608). The current invention allows lenders the much needed ability to pay insights for their consumers and potential consumers. No existing credit scoring model incorporates a prediction of consumer's income risk in predicting payments defaults and credit risk.

Income loss due to unemployment incidents are related to several factors that can be categorized into three groups: macroeconomics (e.g. GDP, money supply, M1, M2, energy prices, etc.), macro-demographics (i.e. factors that pertain to a population of individuals such as occupation industry, occupation type, zip code, etc.) and micro-demographics (e.g. income, years at residence, highest level of education, etc.).

The present invention provides a unique risk scoring model of unemployment incidents using vast amounts of economic data and actual consumer data (FIG. 5 and FIG. 6). With a proprietary data collection originating 6 years ago, the present invention is able to collect data on consumers' historical unemployment incidents, prevailing economic conditions and historical trends, consumers' post unemployment financial stress situation, unemployment severity and payment defaults data. Using sophisticated data-mining techniques and statistical algorithms, the predicative analytical model finds patterns and relationships between economic indicators and an individual's profile to predict the person's likelihood of income loss due to unemployment within the next 12 months (FIG. 8 and FIG. 9). The Job Security Score has been developed using thousands of actual individual profiles, hundreds of macroeconomic variables covering decades of local, regional, and nation economic trends, and the credit behavior of millions of actual borrowers (FIG. 7). Analysis proved that the unemployment risk scores used by the present invention are over 85% accurate in predicting unemployment risks twelve months in advance and are better predictors of consumers' payment default risk.

Previously, the consumer's ability to pay risk was not defined or included in credit scoring models and that they had many limitations (FIG. 10) making it impossible for them to predict consumers' income risk and therefore they were unable to predict consumers' true credit risk. Inclusion of income risk by lenders and credit card issuers in their credit matrix will significantly improve the accuracy and effectiveness of their credit risk prediction capabilities. FIG. 10 describes the limitations of traditional Credit Bureau Scores (1001) and shows the breakdown of one of its embodiment, the FICO score (1002).

In one preferred embodiment, the invention provides an application of statistical algorithms to find patterns and relationships between economic indicators to predict the likelihood of future events with high levels of accuracy. The invention quantifies the inherent income risk in the form of an income risk score. This information can then be used by the income risk based credit score, of which the Job Security Score is a preferred embodiment, to predict consumer behavior, delinquency, charge-off risk, spending trends, likelihood of on-time payments, effectiveness of products or services, and virtually any other factor that can be statistically analyzed and related to consumer's income in making superior assessment of credit risk over traditional credit scores (FIGS. 13, 13A, 15, 16, 21, 22, 23, 26, 27, 29, 30, 31, 32, 33, 34, 35, 36, 37, 38, 39, 40, 41, and 42).

Figure 14:
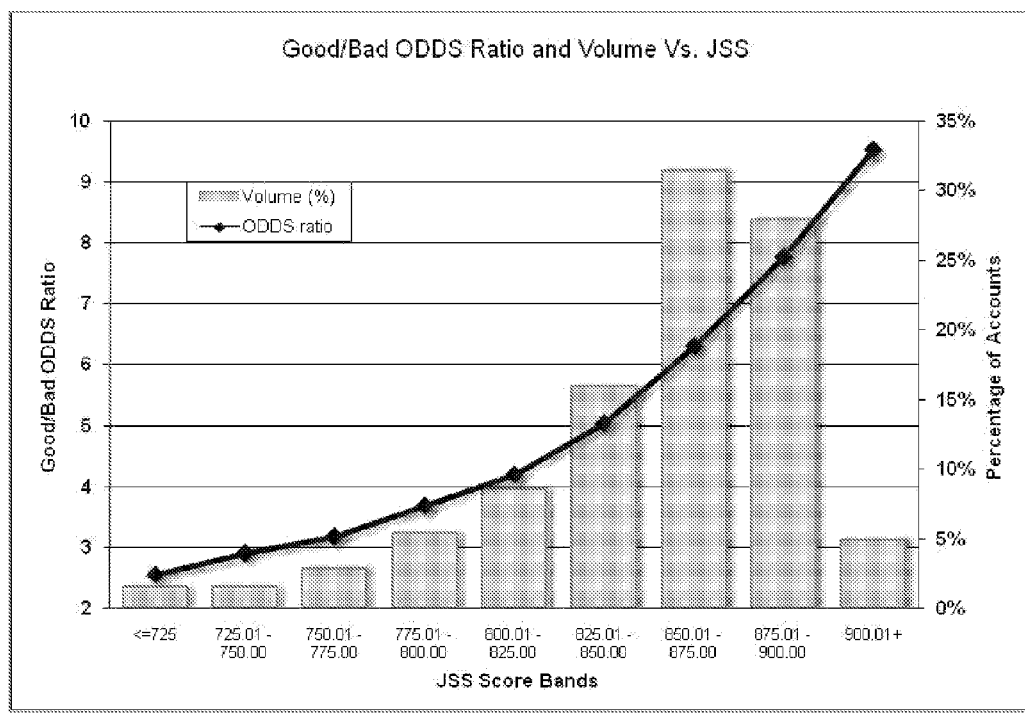
FIG. 14 is a chart showing odds ratios for Income Risk Based Credit Score.

FIG. 14 is a chart shows odds ratios for payment default risk for the Income Risk Based Credit Score (its embodiment as JSS). As shown, the JSS is able to predict and rank order payment default risk very well.

FIG. 15 is a table which shows how the Income Risk Based Credit Score (its embodiment as JSS) is able to identify more good accounts without increasing a lender's loss rate. The JSS allows the lender to decrease their existing credit score cutoff (its embodiment as Custom Score) and yet not increase their loss risk because of JSS's ability to segment good accounts (in blue) and bad accounts (in red) that was not possible before.

Figure 16:
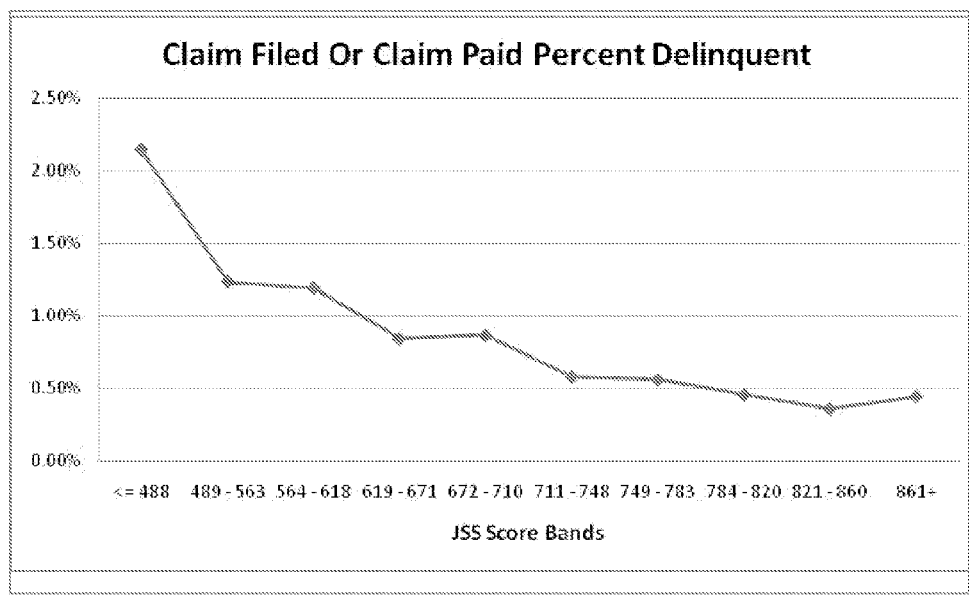
FIG. 16 is a chart showing Income Risk Based Credit Score and its ability to predict mortgage insurance claims.

FIG. 16 is a chart showing Income Risk Based Credit Score (its embodiment as JSS) and its ability to predict mortgage insurance claims (Payment defaults). In using the consumer score in connection with mortgages, lenders can acquire a more informed rational for a mortgage decision. The higher the consumer score, the more likely they are to repay their debts.

Figure 21:
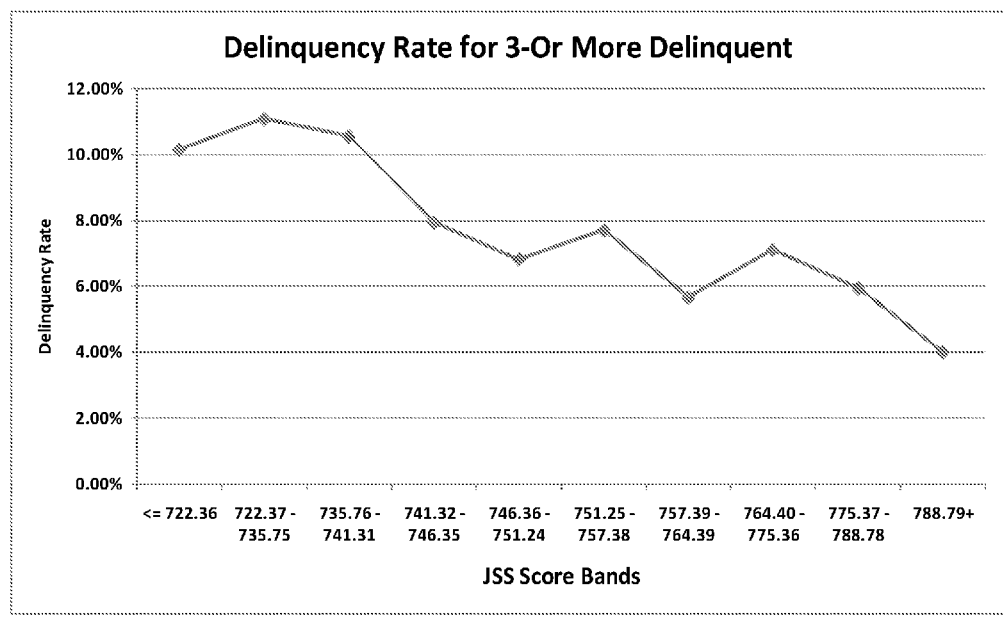
FIG. 21 is a chart showing Income Risk Based Credit Score (its embodiment as JSS) and its ability to payment default risk (delinquency rate)

FIG. 21 is a chart showing Income Risk Based Credit Score (its embodiment as JSS) and its ability to predict payment default risk (delinquency rate). As can be seen, the JSS is able to predict and rank order delinquencies very well.

Figure 22:
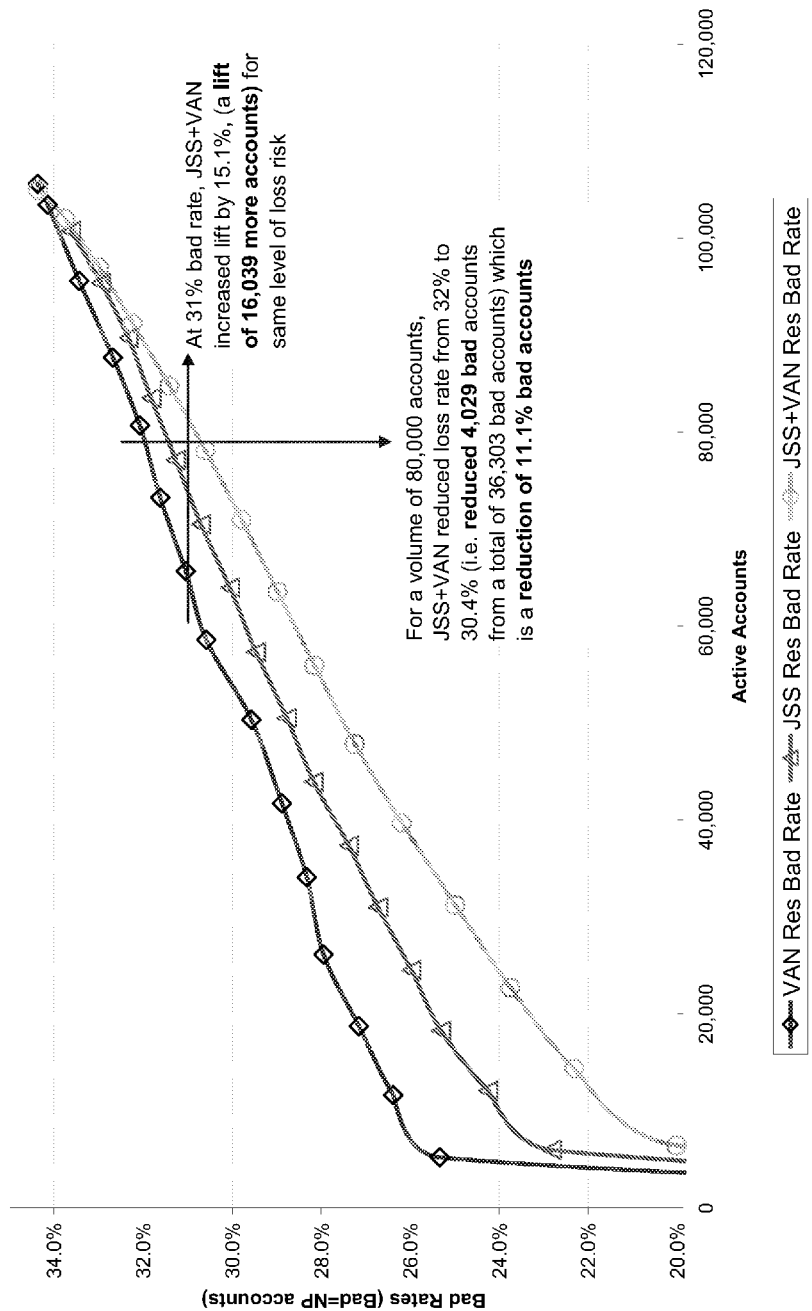
FIG. 22 is a chart comparing the predictive power of Income Risk Based Credit Score (its embodiment as JSS) and traditional credit score (its embodiment as VAN score) for payment default risk (loss rate or bad rate)

FIG. 22 is a chart showing loss curves for Income Risk Based Credit Score (its embodiment as JSS), a credit bureau score (its embodiment as VAN score), and for a combined JSS+VAN score. As can be seen, the JSS is able to increase good accounts by 15% and decrease bad accounts by 11% clearly demonstrating that JSS offers new credit risk insights.

FIG. 23 is a table showing KS-stats (a higher KS indicates better predictive power) for Income Risk Based Credit Score (its embodiment as JSS), a credit bureau score (its embodiment as VAN score), and for a combined JSS+VAN score. As can be seen, the JSS is able to increase KS-stats by 50% over existing VAN score.

FIG. 26 is a chart showing loss curves for Income Risk Based Credit Score (its embodiment as JSS), and a credit score (its embodiment as VAN score) and for a combined JSS+VAN score. As can be seen, the JSS is able to increase good accounts by 25% and decrease loss rates by 5% clearly demonstrating that JSS offers new credit risk insights and has superior risk separation capabilities.

FIG. 27 is a chart showing loss curves for Income Risk Based Credit Score (its embodiment as JSS and ISS), a response score (its embodiment as RESP score), a credit score (its embodiment as VAN score), and for a combined ISS+ RESP score As can be seen, the ISS can be used to approve good accounts that were declined by the use of existing credit scores.

FIGS. 29 to 42 show various comparisons between Income Risk Based Credit Score (its embodiment as JSS and ISS), a response score (its embodiment as RESP score), a credit score (its embodiment as FICO and VAN score) and demonstrate how the Income Risk Based Credit Score is able to add new consumer insights in credit scoring and prospect scoring.

Figure 13:
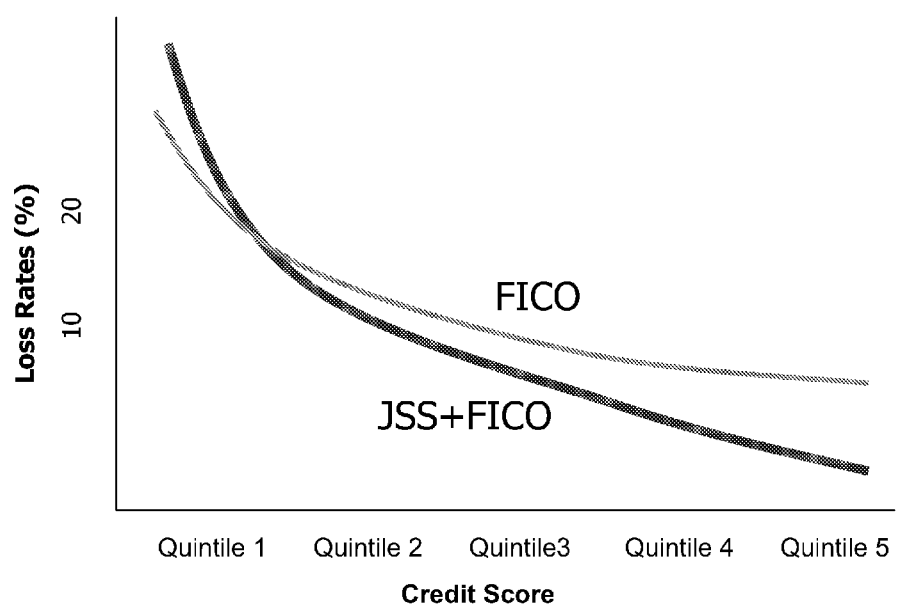
FIGS. 13 and 13A are charts comparing loss curves for Income Risk Based Credit Score and a traditional credit score.
Figure 13A:
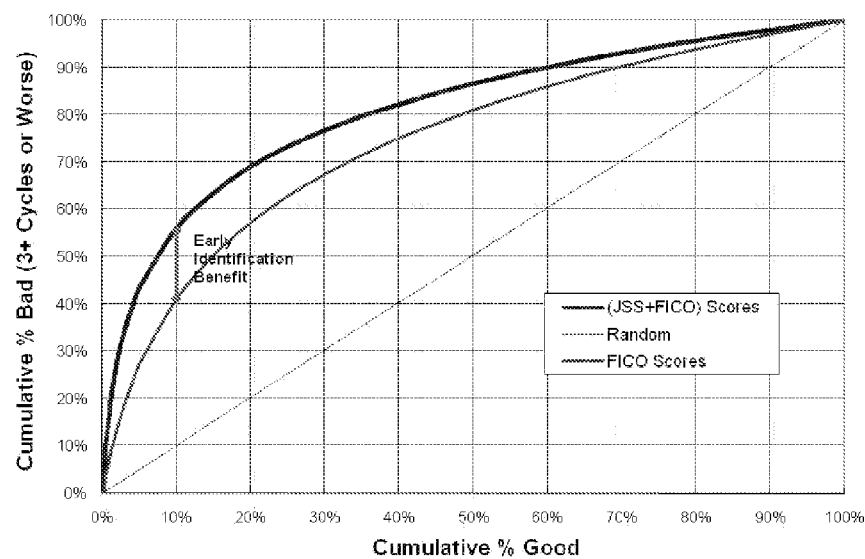

The present invention predicts income-loss risk by measuring how economy is changing and how it impacts consumers' income and income risk to forecasts future paying capacity—or paying ability—of consumers. This offering of new and in-depth comprehension into future consumer credit behavior has not yet been captured by any credit bureau scores or other credit scores. In capturing economic impact on an individual consumer's ability to pay, the present invention utilizes elements not previously available in the field. Further, the Job Security Score can be used as the primary and sole credit score to predict credit risk or it can be used in conjunction with current scoring methods (FIGS. 13 and 13A). By creating a way to predict a separate aspect of consumer risk originating from their income risk, the present invention greatly enhances the accuracy of consumer credit risk assessment. FIGS. 13 and 13A are charts comparing Income Risk Based Credit Score (its embodiment as Job Security Score or JSS) against a traditional credit score (its embodiment as FICO) for payment default risk and they show that JSS improves risk prediction. The Job Security Score (or JSS) is an embodiment of the invention and measures the ability to pay, and credit risk, of an individual. This chart shows loss curves for JSS and FICO and it demonstrates the superior ability of the JSS over FICO in predicting and segmenting good and bad accounts.

The income risk based credit score, of which the Job Security Score is a preferred embodiment, is also a prospect score and capable of scoring any consumer in the marketplace. All existing scoring models and methods are reliant on credit data and/or payment data, but none include income risk except present invention. In implementing a scoring model that is accurate in its credit risk assessments, lenders can improve risk assessment by an average of 11%. Testing shows an average of 9% lift for thick file credit card portfolios and 30% lift for thin-file and no-hit credit card portfolios. Considering the approximately 70 million consumers who are not scored have a much high delinquency rate than the average consumer, the income risk based credit score, of which the Job Security Score is a preferred embodiment, will greatly benefit lenders.

In one preferred embodiment, the income risk based credit scoring model generates a Job Security Index (JSI) that measures the job conditions for a MSA/Zip location. By correlating with consumer spending, credit charge-offs, and delinquencies, the JSI is a useful prospective score when evaluating how consumer behavior is likely to change with fluxes in the economy. Because the Job Security Score is updated on a monthly basis, the JSI is able to reflect current conditions (FIG. 18). Additionally, the JSI can be applied to any consumer lists in order to identify better prospects.

In another preferred embodiment, the present invention will improve acquisitions because of better-informed targeting and segmentation of prospects which the invention provides (FIG. 24, FIG. 25, FIG. 28, and FIG. 43).

Figure 24:
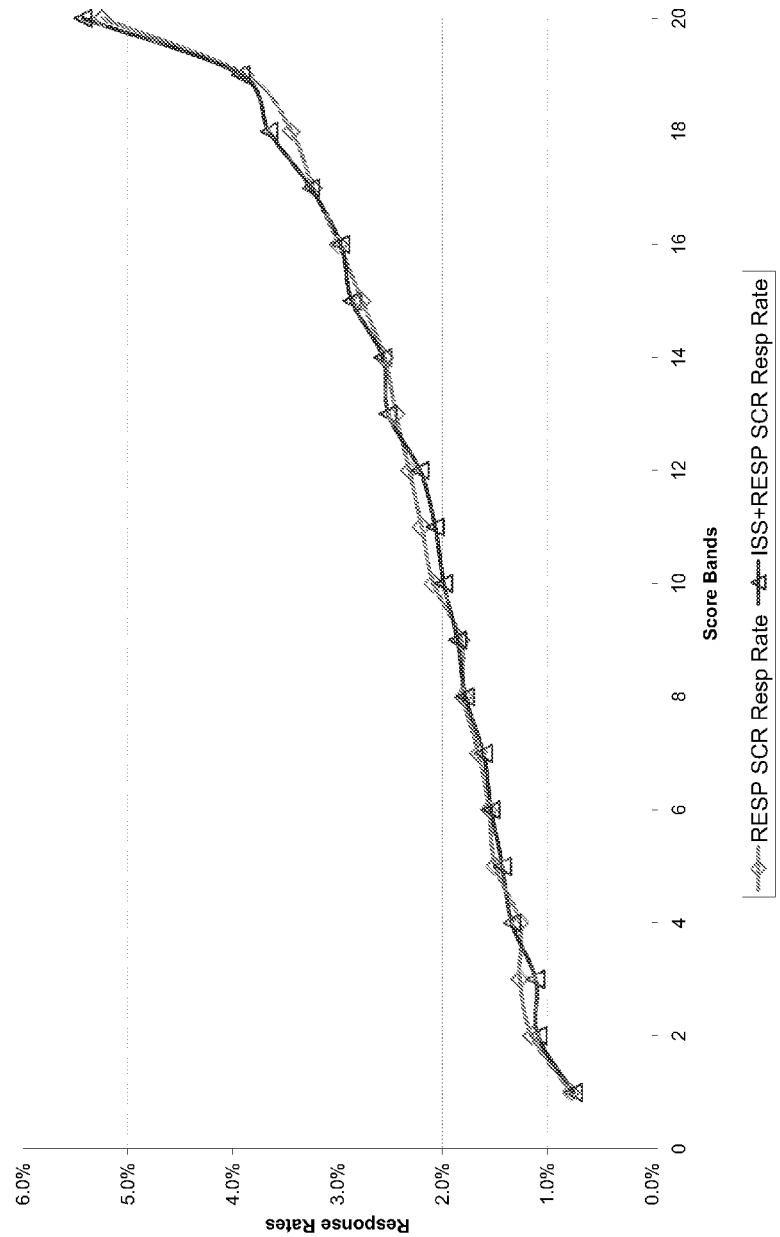
FIG. 24 is a chart for Income Risk Based Credit Score (its embodiment as ISS) versus traditional response score (its embodiment as RESP SCR) for prospect scoring.

FIG. 24 is a chart for Income Risk Based Credit Score (its embodiment as Income Stability Score, or ISS in short) versus traditional response score (its embodiment as RESP SCR) for prospect scoring.

Figure 25:
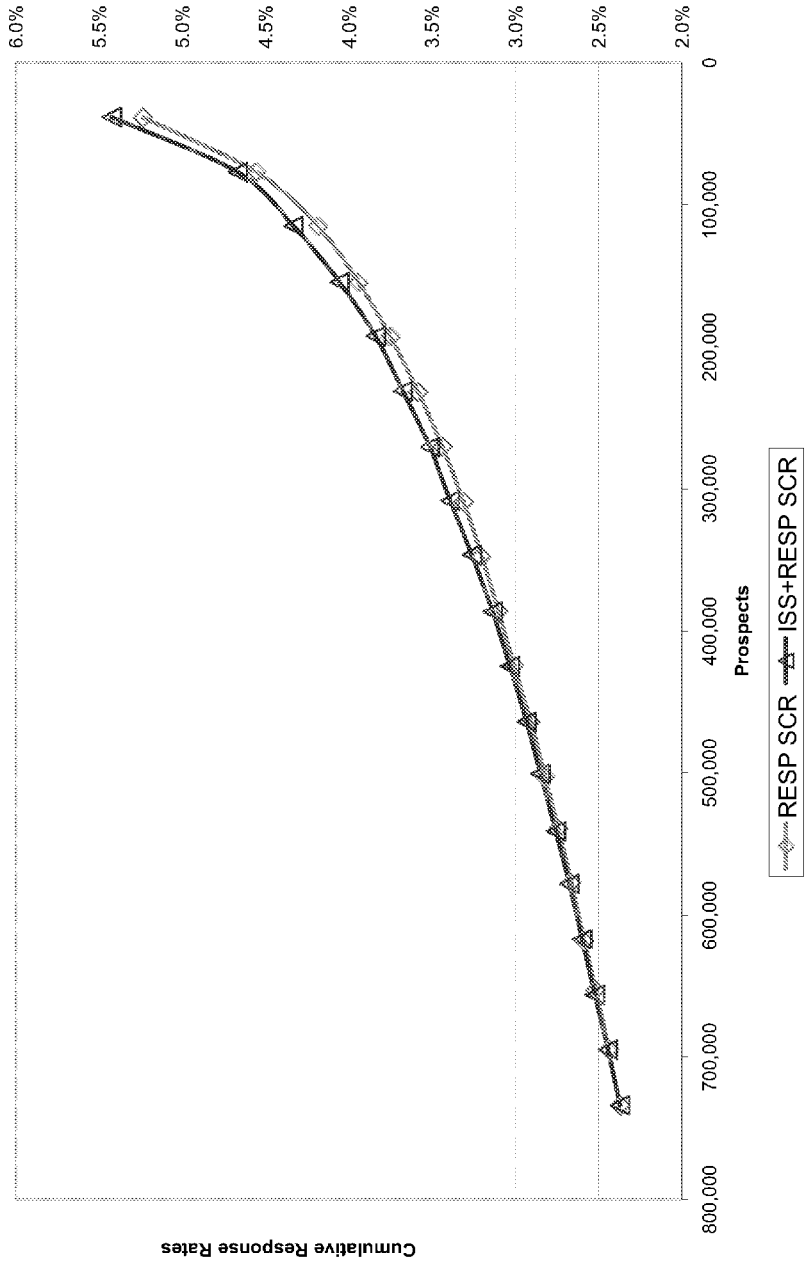
FIG. 25 is a chart comparing Income Risk Based Credit Score (its embodiment as ISS) and a traditional response score (its embodiment as RESP SCR) for predicting prospect response rates.
Figure 29:
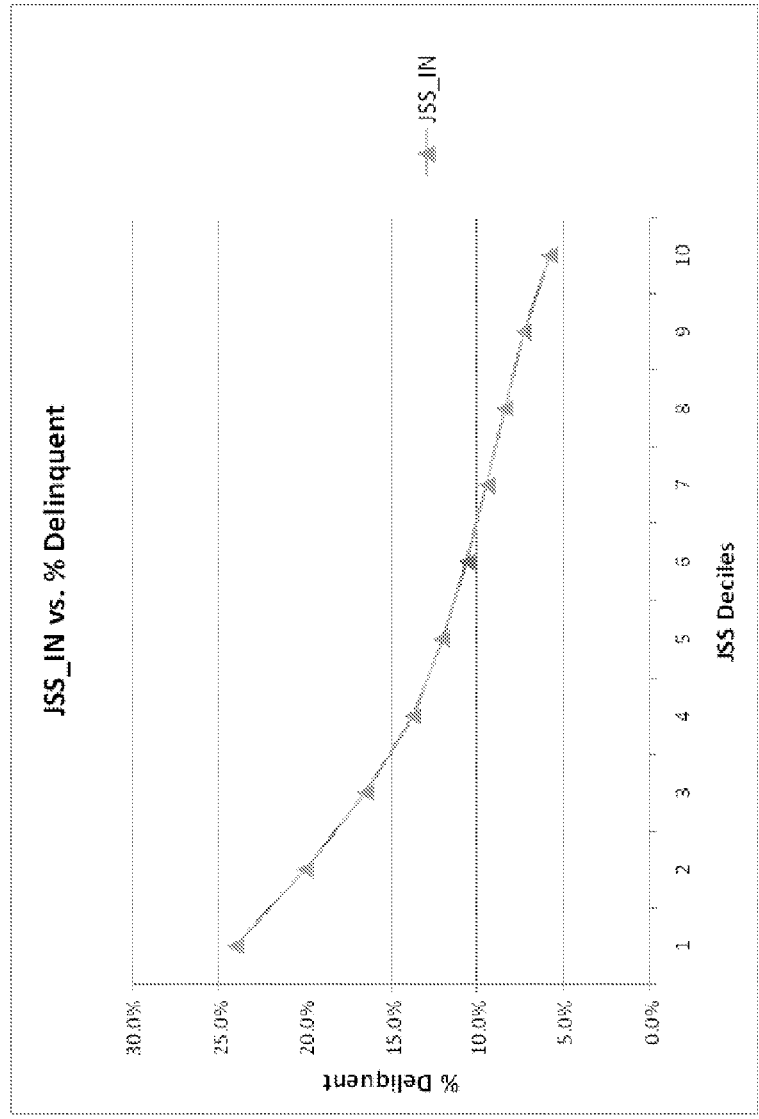
FIG. 29 is a chart showing the relationship between Income Risk Based Credit Score (its embodiment as JSS_IN) and consumer delinquencies.
Figure 30:
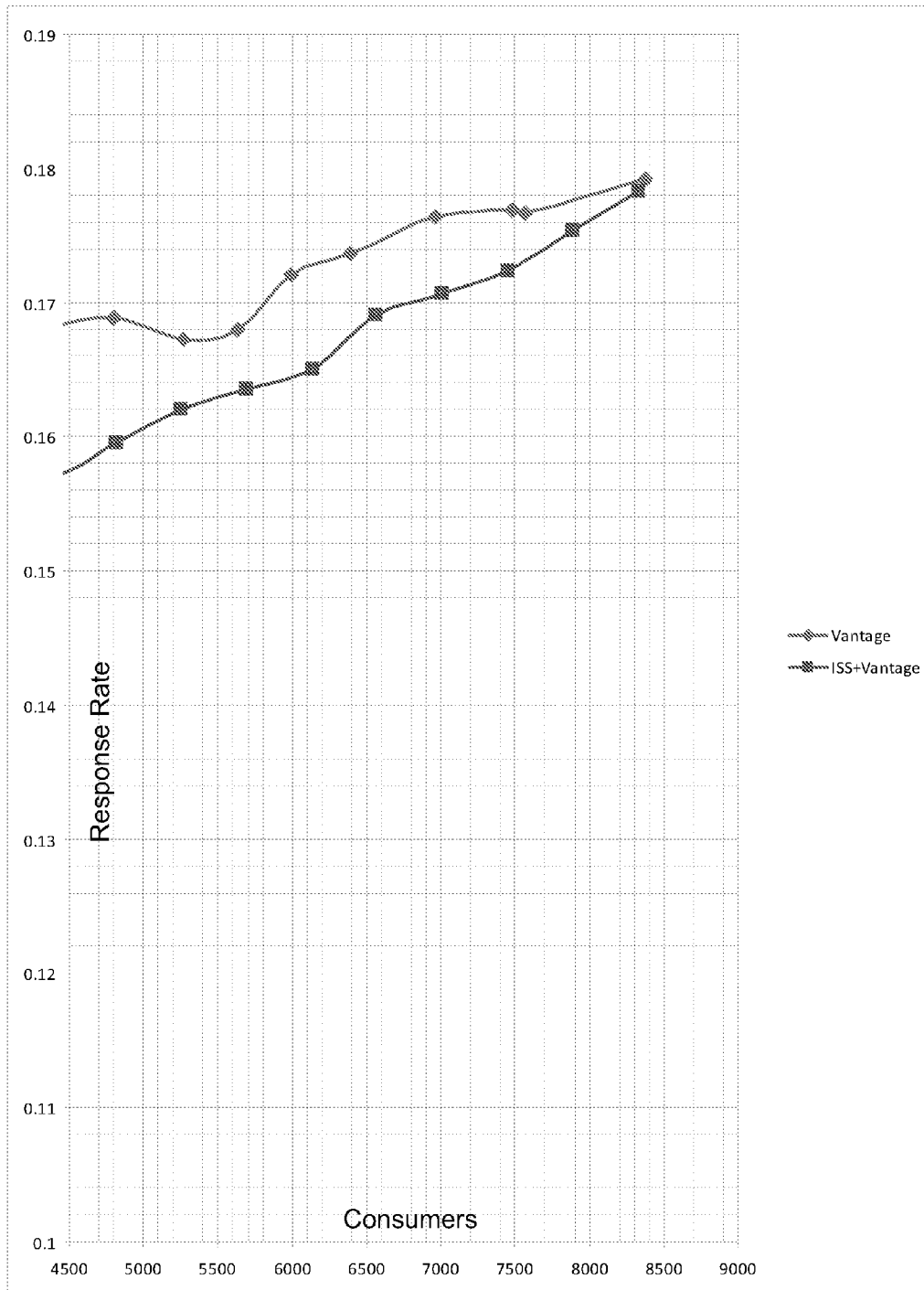
FIG. 30 is a chart comparing effectiveness of Income Risk Based Credit Score (its embodiment as ISS) and traditional credit score (its embodiment as Vantage) in predicting response rates.
Figure 31:
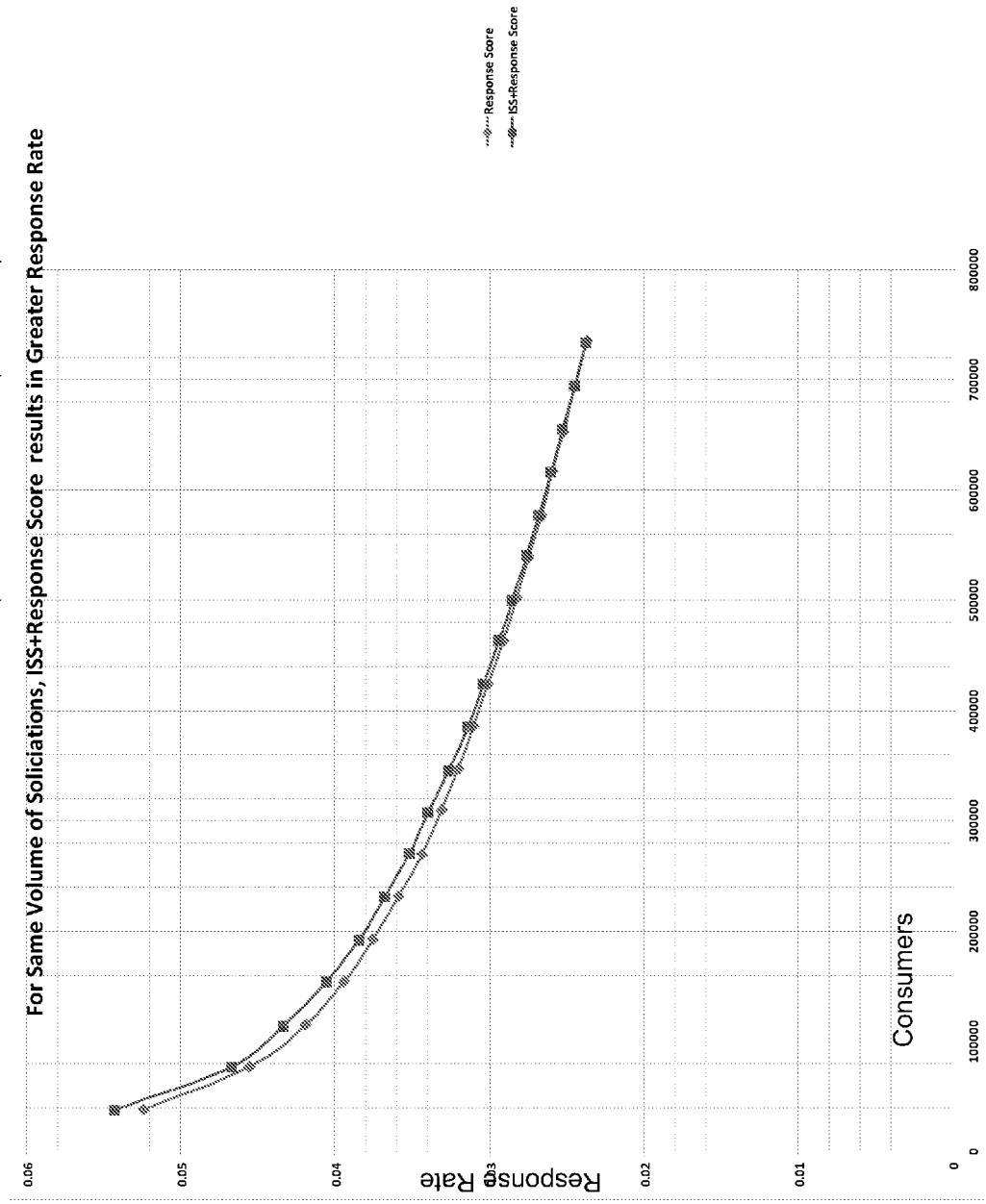
FIG. 31 is a chart comparing effectiveness of Income Risk Based Credit Score (its embodiment as ISS) and a response score in predicting response rates.
Figure 32:
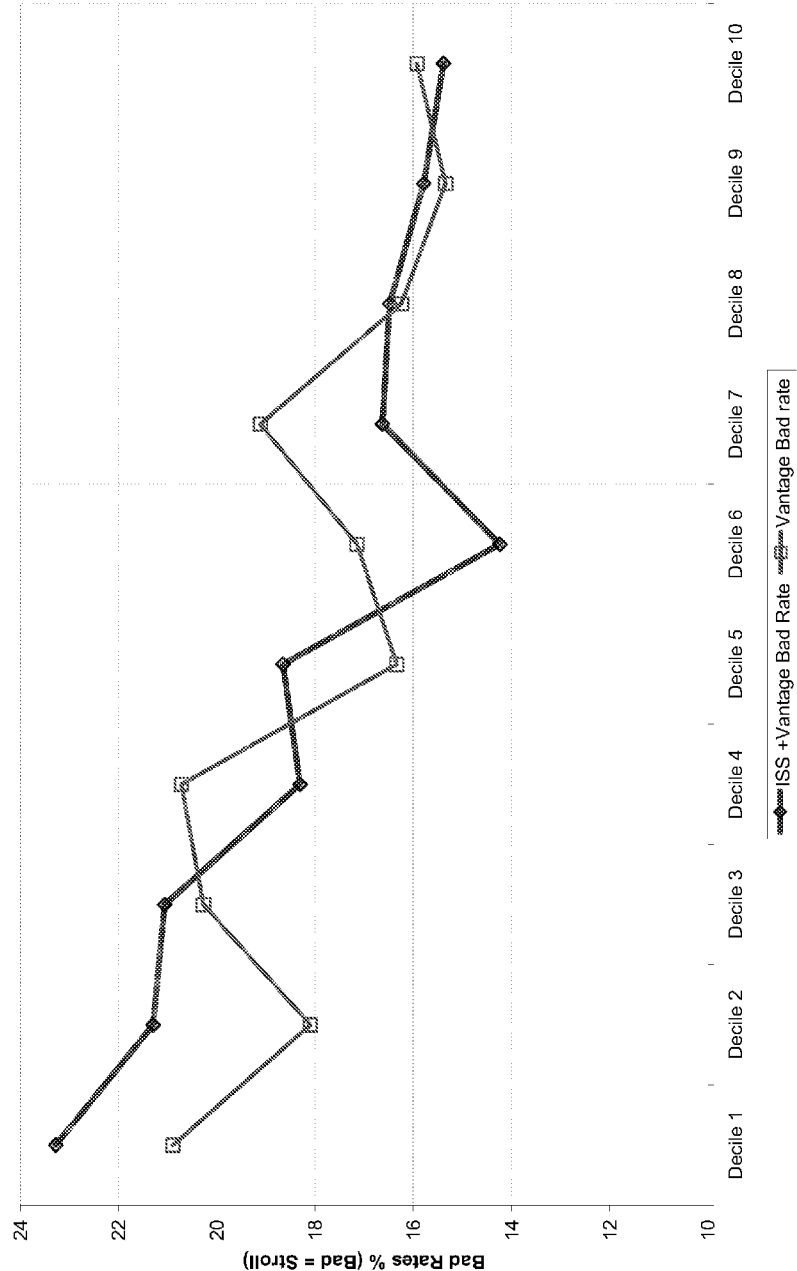
FIG. 32 is a chart comparing Income Risk Based Credit Score (its embodiment as ISS) and traditional credit score (its embodiment as Vantage) in predicting payment default risk (bad rates)
Figure 34:
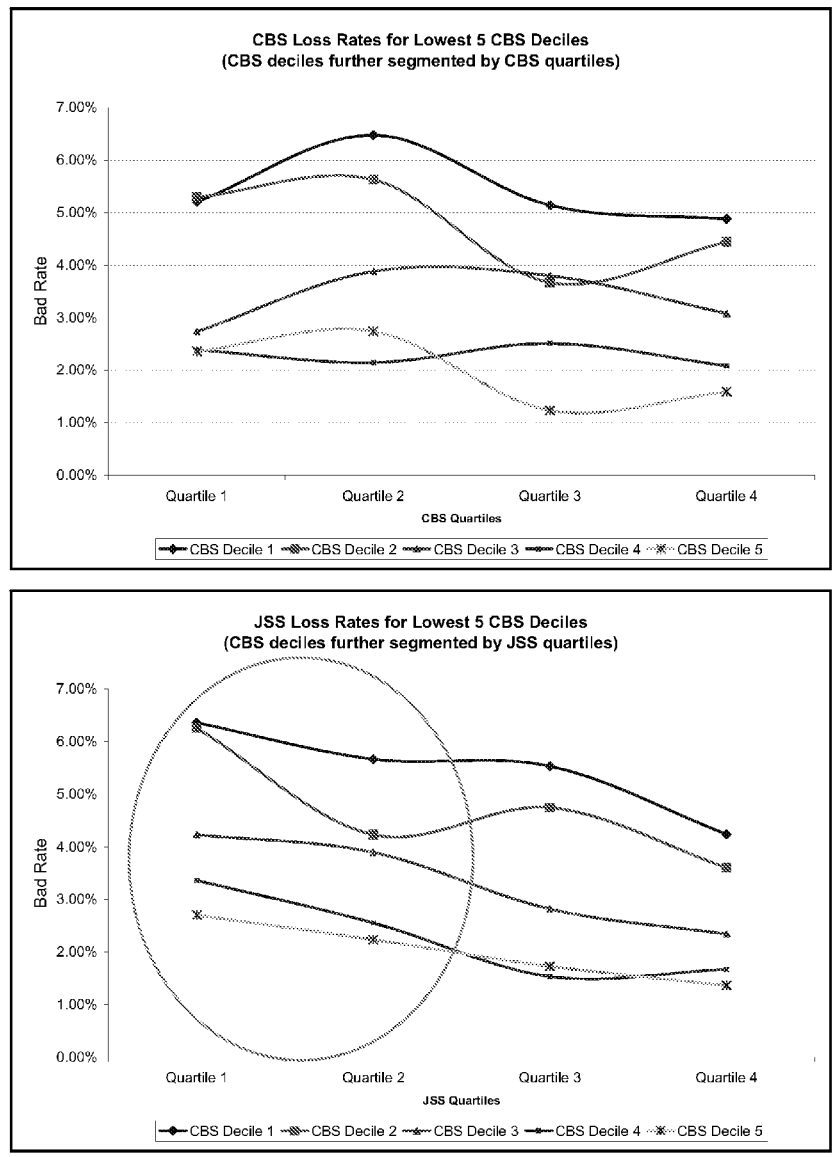
FIG. 34 shows two charts comparing the effectiveness of Income Risk Based Credit Score (its embodiment as JSS) and traditional credit score (its embodiment as CBS score) in predicting payment default risk.
Figure 37:
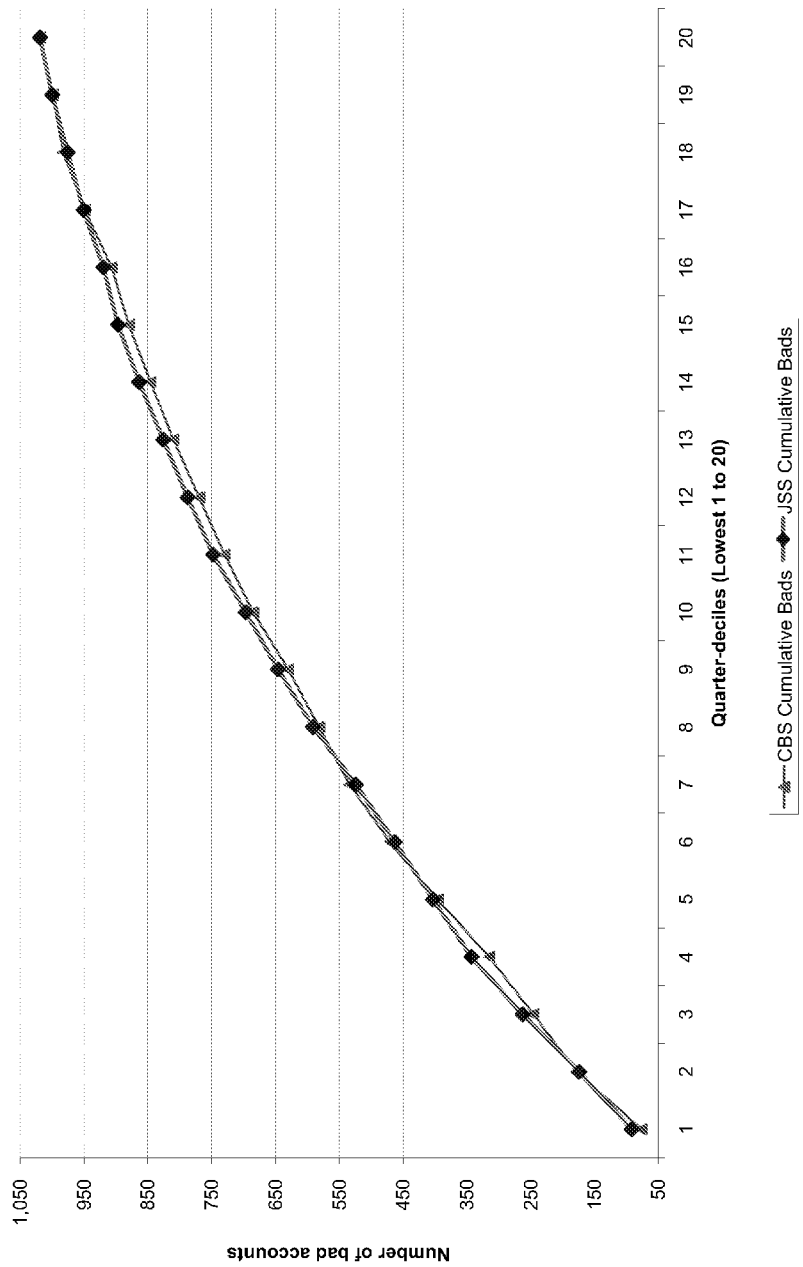
FIG. 37 is a chart comparing Income Risk Based Credit Score (its embodiment as JSS) versus traditional credit score (its embodiment as CBS score) for payment default risk.
Figure 38:
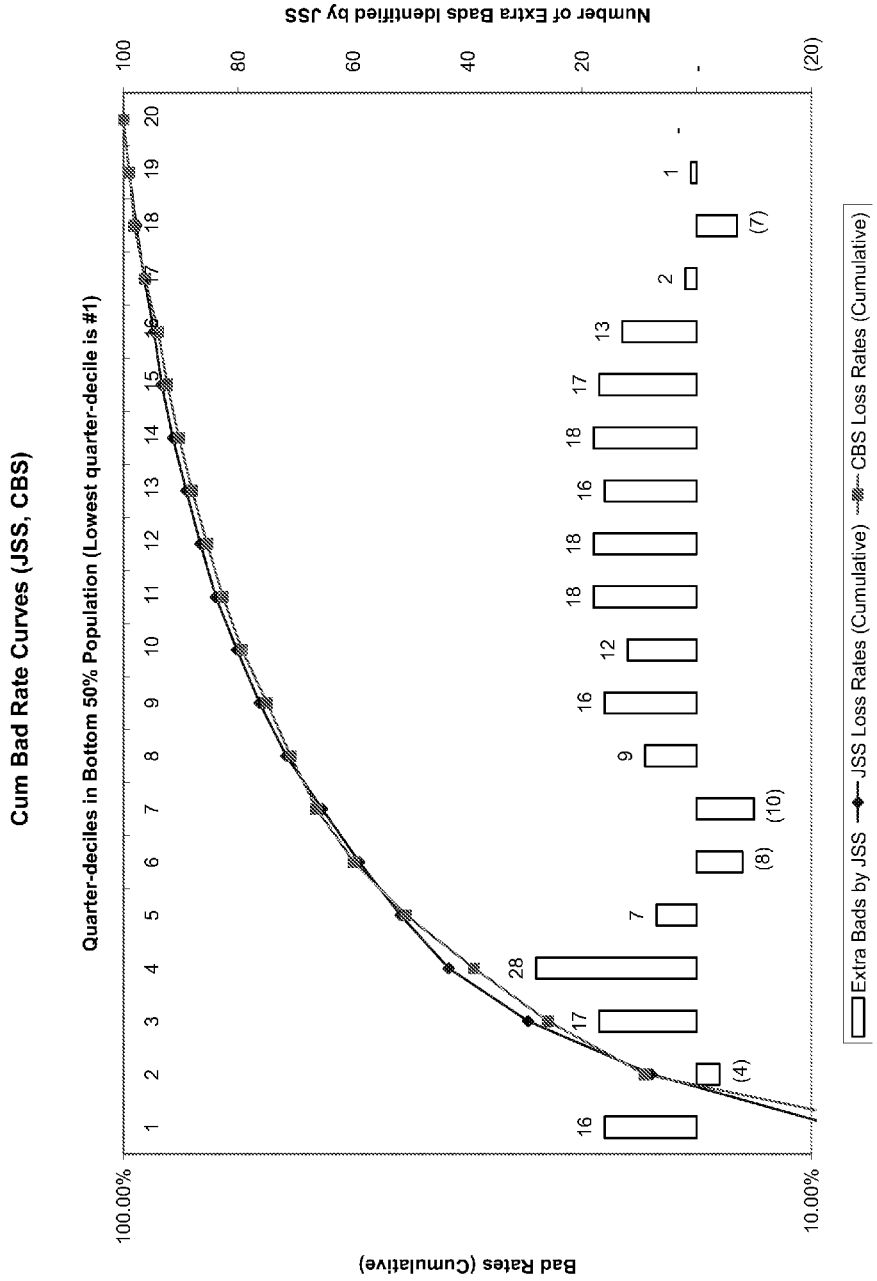
FIG. 38 is a chart comparing Income Risk Based Credit Score (its embodiment as JSS) versus traditional credit score (its embodiment as CBS score) for payment default risk and ability to identify high risk accounts (bads)
Figure 39:
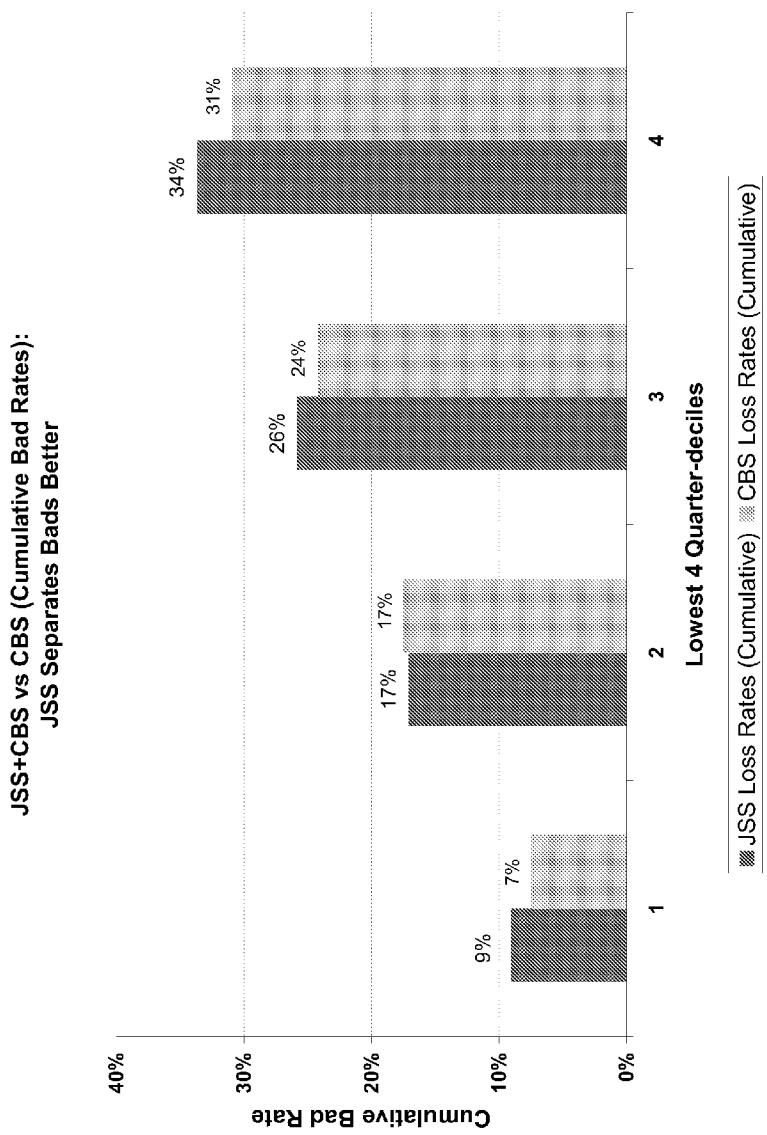
FIG. 39 is a chart comparing Income Risk Based Credit Score (its embodiment as JSS) versus traditional credit score (its embodiment as CBS score) for cumulative bad rates.
Figure 41:
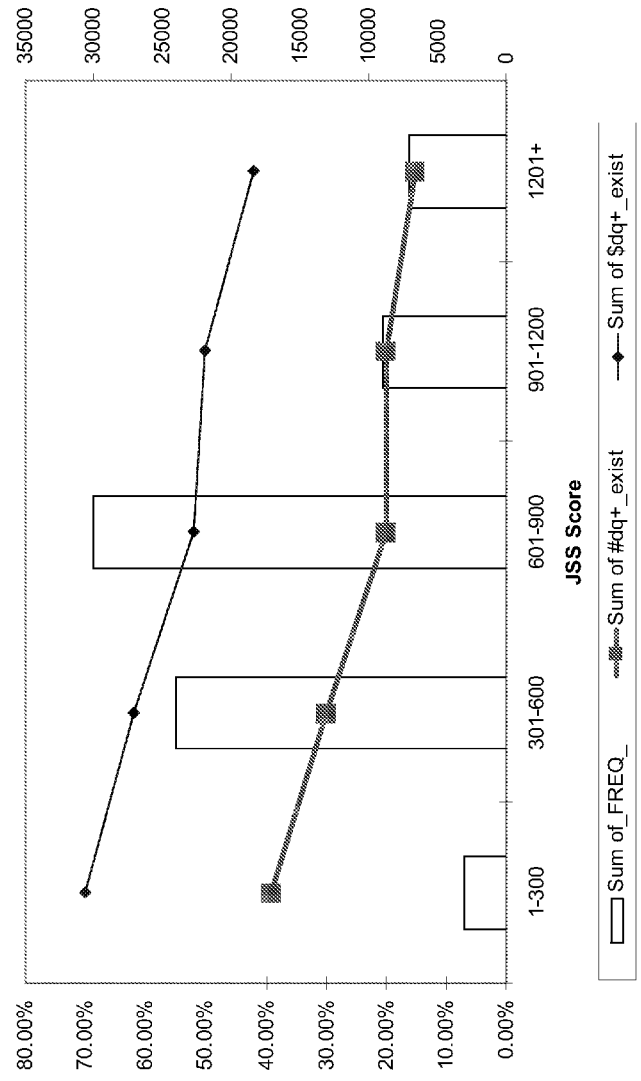
FIG. 41 is a diagram showing Income Risk Based Credit Score (its embodiment as JSS) and its ability to predict payment default risk (delinquencies) for existing accounts.
Figure 42:
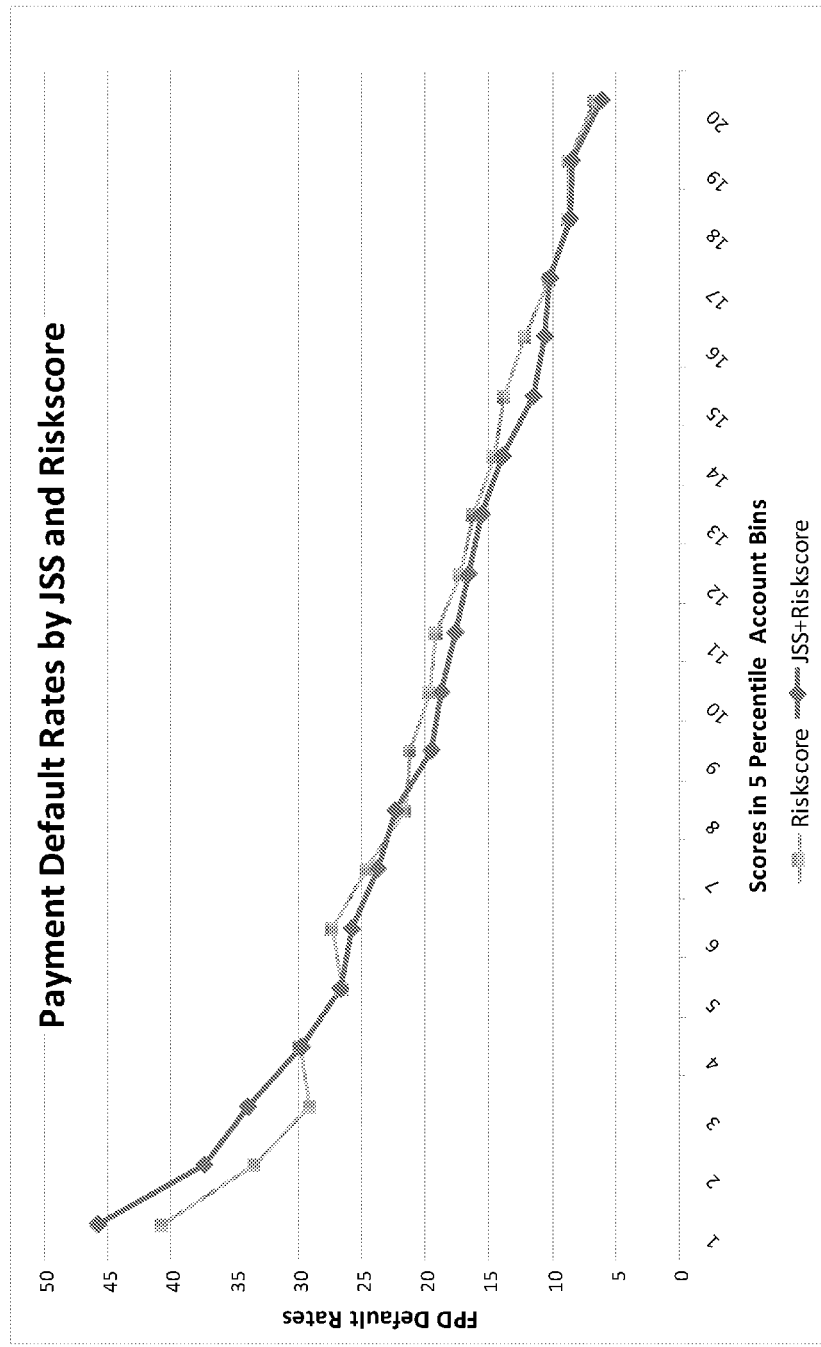
FIG. 42 is a chart showing Income Risk Based Credit Score (its embodiment as JSS) and traditional credit score (its embodiment as Riskscore) and their abilities to predict payment default risk (first payment default or FPD default rates)

FIG. 25 is a chart showing response rate curves for Income Risk Based Credit Score (its embodiment as Income Stability Score, or ISS) and a response score (its embodiment as RESP score). As can be seen, the ISS is able to increase response rate by 4%.

FIG. 28 is a table showing KS-stats for Income Risk Based Credit Score (its embodiment as JSS and ISS), a response score (its embodiment as RESP score), a credit score (its embodiment as VAN score), and for a combination of above scores. As can be seen, the ISS is able to increase KS-stats by 49% and 22% over existing RESP scores.

Figure 43:
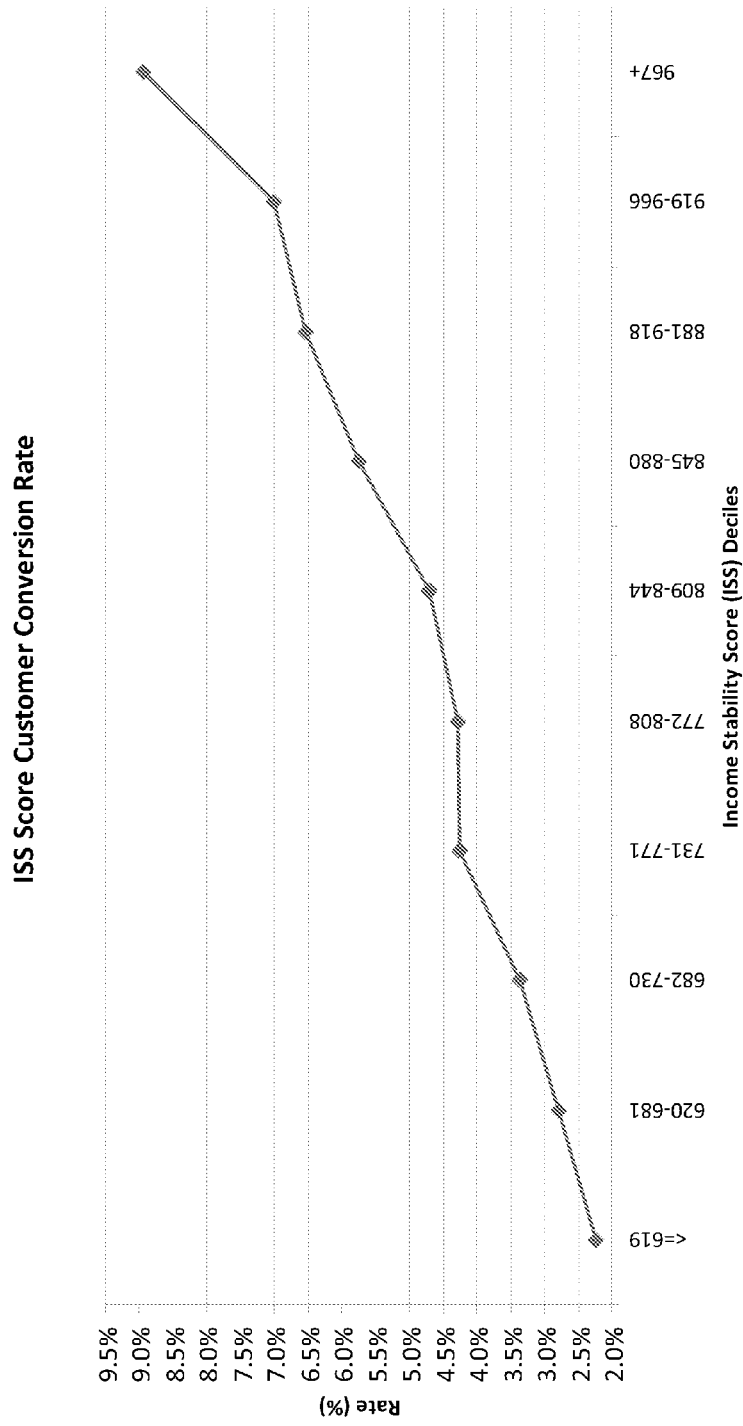
FIG. 43 is a chart showing Income Risk Based Credit Score (its embodiment as ISS) and its ability to predict customer conversion rate.

FIG. 43 is chart shows the income risk based credit score (its embodiment as ISS) and its ability to predict customer conversion rate. The ISS can be used for alternative purposes, such as identifying customer conversation rate as displayed.

When lenders use income risk based credit score, pricing, loan amounts, and product offering decisions will be more effective and profitable due to new credit risk insights not available through conventional credit bureau scoring. Further, delinquencies and charge-offs will decrease due to early identification of high risk accounts. Businesses can now market to more promising prospects and approve more applicants based on the "true" overall credit risk, rather than basing their decisions on an outdated view of credit risk offered by credit bureau scores alone. Prospect identification processes will be more effective as most identified prospects will match the ideal customer profile requirements. The offer response rate will improve as well because of the greater precision in targeting. The approval decision process is enhanced due to better separation of applicant's credit risk. By gaining insights into ability to pay risk using Job Security Score, businesses can now get a complete picture of consumer's credit risk thereby improving their portfolio's size and quality while giving them a significant competitive advantage.

It is noted that there are an infinite number of ways to create homogenous classes of people with similar risks for the millions of people nationwide. Because there never has been a personal unemployment risk score and a consumer income risk score, there is no actuarial data available by any established risk classes related to unemployment rates. Therefore, the present invention also presents a method and model to segment the labor force into homogenous unemployment risk classes and establishes empirical relationships between historical unemployment rates and risk classes and income risk.

Another aspect of the present invention provides account management strategies using the Job Security Score. By monitoring the Job Security Score of accounts on a constant basis (scores are updated every month) lenders can identify a high risk account before the account actually becomes a high risk/bad account—unlike credit bureau scores which deliver the news after the account has negative items on file. Thus, the new predictive power enables lenders the time and insights to take strategic initiatives to manage and mitigate the risk before it is too late.

In an additional embodiment, the present invention provides for better-informed credit line decisions. Both credit line decrease decisions and balance build/balance transfer offer decisions are most effective and profitable when they are based on the latest, most complete, and most accurate assessment of consumer's risk. Since Job Securities Scores change every month, even for consumers whose profiles remain unchanged, they reflect the latest economic conditions that may impact jobs and income prospects. Lenders will always have the latest and most accurate risk assessment possible, allowing them to deploy more profitable credit line increase and decrease strategies.

When the Job Security Score is combined with credit bureau scores, or other internal risk scores, it redistributes the population in such a way that lenders can lower their cut-off credit bureau scores allowing for more approvals, without lowering the risk threshold (FIGS. 13, 13A, 14, and 15). In fact, at the same time, the risk profile of the portfolio screened and managed using a combined score (e.g. Job Security Score+FICO) decreases because risk assessment is more accurate, leading to an increase in portfolio quality and a decrease in losses (FIGS. 13, 13A, 14, 15, 16, 21, 22, 23, 24, 25, 26, 27, 28, 29, 30, 31, 32, 33, 34, 35, 36, 37, 38, 39, 40, 41, 42, and 43).

The present invention also preferably provides improved marketing capabilities for businesses. With the advanced prospect scoring, marketing strategies can be more focused and target the ideal populations. In addition, the present invention enhances any prescreening of an individual and can be used to strengthen predictions (FIGS. 24, 25, 28 and 43). This allows for the early identification of high risk individuals, narrowing the delinquency probabilities and making marketing more sophisticated.

The present invention also preferably provides lenders with the following benefits: a more accurate picture of consumer's credit risk, in both good and bad economic times; a proactive and leading indicator of credit risk (unlike credit bureau scores, which are reactive and lagging); and improved segmenting and differentiation due to better credit risk prediction capabilities (FIGS. 13, 13A, 14, 15, 16, 21, 22, 23, 24, 25, 26, 27, 28, 29, 30, 31, 32, 33, 34, 35, 36, 37, 38, 39, 40, 41, 42, and 43).

As described above, the present invention provides methods for implementing an unique indicator of consumer credit risk stemming from the ability to pay risk associated with each and every individual applying for credit. Its applications are in all those areas that involve credit risk assessment or predicting credit dependent behavior.

It is also to be understood that this invention is not limited to using the data, records, data elements, variables and field structures described herein, and other data elements, data, and physical structures will be equivalent for the purposes of this invention. The invention has been described with reference to a preferred embodiment, along with several possible variations; however, it will be appreciated that a person of ordinary skill in the art can effect further variations and modifications without departing from the spirit and the scope of the invention.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A method of determining an individual's unemployment risk based credit score, comprising:
   generating by a computer, an unemployment risk probability for the individual using the individual's personal data including age, education, demographic data and employment history, and using historical employment, unemployment, and economic data;
   generating by the computer, an income loss risk for the individual using said unemployment risk probability;
   generating by the computer, an income reduction risk for the individual;
   generating the individual's unemployment risk based credit score based on the unemployment risk probability, income loss risk, income reduction risk, personal data, and national employment data, national unemployment data, and national economic data,
   wherein said individual's income risk based credit score provides an indication of a probability of the individual defaulting on one or more of the individual's payment obligations; and
   wherein the step of using the unemployment risk probability, income loss risk, income reduction risk, personal data, national employment data, and national economic data to generate the individual's unemployment risk based credit score further comprises the steps of:
     segmenting a national workforce population into homogenous risk categories, with each risk category comprising a plurality of homogenous sub risk subcategories;
     segmenting dependent, unemployed and non-working individuals into risk categories and sub categories;
     assigning a risk factor weight to each of the risk categories and sub risk subcategories;
     predicting an unemployment rate for a finite time frame, for each risk category and subcategory;
     predicting an income loss probability for a finite time frame, for each risk category and subcategory;
     transforming the said unemployment rate predictions and income loss risk predictions, or any mathematical combinations of these, into a mathematical score on a scale of zero to one thousand or any other similar scale, which may be developed using linear or non-linear mathematical equations;
     transforming the said unemployment rate score and income loss risk score into an unemployment risk based credit score by correlating them with individuals' ability to pay and credit data;
     predicting an ability to pay risk for a finite time frame, for each risk category and sub category and converting it into an ability to pay score;
     predicting credit default risk for a time frame, for each risk category and sub category and converting it into an unemployment risk based credit score; and
     providing a quantitative and qualitative explanation and narrative of the contributing risk factors, relative ranking of said unemployment risk based credit scores by comparing it with other scores and score groups including, but not limited to, national and regional risk scores, industry and sub-industry scores, education scores, and scores grouped based on economic, credit and payment behavior, and demographic similarities and other common attributes.

2. The method of claim 1, wherein said homogeneous risk categories comprise education, industry, age, gender, occupation, state, region, income, work experience, training level, work performance, job change frequency, industry change frequency, historical unemployment data, unemployment severity, job necessity, debt-to-income ratio, expenses-to-income ratio, and job confidence.

3. The method of claim 1, wherein said predicted unemployment rates are generated based on information comprising national, regional, and local unemployment rates, layoff data, job hiring trends, consumer price index, producer price index, interest rates, trade balance, housing starts, industrial production, currency exchange rates, retail sales, personal income and credit, consumer expenditure, industry capacity utilization, government spending, capital spending, consumer confidence and non-government data.

4. The method of claim 1, wherein the step of generating the unemployment risk based credit score includes quantifying the credit risk of the individual.

5. The method of claim 1, wherein the said unemployment risk based credit score is modified by steps comprising:
   combining by the computer the unemployment risk based credit score with credit bureau scores and consumer risk scores using equal or non-equal weights for each;
   customizing by the computer the income risk based credit score, credit bureau scores and consumer risk, and a selected portfolio's credit performance data; and
   producing at the computer, a more comprehensive consumer credit risk score and credit scoring system for a specific pool of accounts, portfolio, or lender.

6. The method of claim 1, further comprising the step of updating the income risk based credit score at regular intervals.

7. The method of claim 1, wherein the unemployment risk based credit score is used to predict the ability to pay and buy for an individual for use as a prescreening score and as a prospect score for identifying prospects and for predicting response rates for marketing purposes.

8. The method of claim 1, wherein the unemployment risk based credit score is generated by a method comprising:
   creating databases to store national, regional and local employment and unemployment data, economic data, and consumers' personal data;
   periodically adding new data into said databases;
   periodically updating said databases with derivative data and predicted data using mathematical processes;
   determining what homogeneous risk group an individual belongs to; and
   forecasting unemployment risk and income risk for homogeneous risk groups in order to measure and predict the individual's unemployment risk based credit score.

9. A method of determining an individual's unemployment risk based credit score, comprising:
   generating by a computer, an unemployment risk probability for the individual using the individual's personal data including age, education, demographic data and employment history, and using historical employment, unemployment, and economic data;
   generating by the computer, an income loss risk for the individual using said unemployment risk probability;
   generating by the computer, an income reduction risk for the individual;
   generating the individual's unemployment risk based credit score based on the unemployment risk probability, income loss risk, income reduction risk, personal data, and national employment data, national unemployment data, and national economic data, wherein the computation of unemployment risk based credit score comprises the steps of:
   correlating by the computer the income loss risk of the individual with credit default data and payment default data;
   analyzing by the computer the correlation and statistical relationships between actual unemployment data, income loss data, and credit default data for populations of individuals;
   correlating and comparing by the computer the actual income loss data and the income loss risk with actual and projected credit risk and payment default data for populations of individuals;
   correlating by the computer the income loss risk with future ability to pay for the individual;
   establishing statistical relationships and mathematical equations between ability to pay and credit risk through retro tests and back tests by working with relevant banks, financial institutions, credit unions, credit bureaus, data warehousing companies, and other companies which have individual level data;
   transforming by the computer the income loss risk and ability to pay factors into a probability of payment default for the individual;
   transforming by the computer the probability of payment default into an unemployment risk based credit score consisting of a single quantity;
   developing by the computer a statistically valid and empirically sound credit scoring model that predicts an individual's credit risk by using the unemployment risk based credit score;
   validating the unemployment risk based credit score's predictive power and risk separation capability by testing the score using actual consumer data;
   correlating by the computer the predictive power of the unemployment risk based credit score with performance characteristics of a specific loan portfolio, or with many different loan portfolios;
   establishing odds ratios and loss curves for unemployment risk based credit score for different loan portfolio types including marketing, acquisitions, account management and collections;
   developing unemployment risk based credit score usage strategies for lending and lending related decisions; and
   developing and rendering unemployment risk based credit score for use by marketers, lenders and companies for use as a prospect score, primary credit score, and as a secondary credit score to be used in conjunction with other types of credit scores and alternative credit scores
   wherein said individual's income risk based credit score provides an indication of a probability of the individual defaulting on one or more of the individual's payment obligations.

10. The method of claim 9, further comprising the step of combining the unemployment risk based credit score with any existing credit bureau scores or risk scores in order to increase approvals by redistributing the population through segmentation and differentiation based on advanced credit risk prediction capabilities.

* * * * *